US008868627B2

(12) United States Patent
Ueda et al.

(10) Patent No.: US 8,868,627 B2
(45) Date of Patent: Oct. 21, 2014

(54) INFORMATION PROCESSING APPARATUS, INFORMATION PROCESSING METHOD, AND PROGRAM

(75) Inventors: Kenjiro Ueda, Kanagawa (JP); Hiroshi Kuno, Kanagawa (JP); Toshiya Hamada, Saitama (JP); Kazuo Yamamoto, Chiba (JP)

(73) Assignee: Sony Corporation, Tokyo (JP)

( * ) Notice: Subject to any disclaimer, the term of this patent is extended or adjusted under 35 U.S.C. 154(b) by 1157 days.

(21) Appl. No.: 12/693,017

(22) Filed: Jan. 25, 2010

(65) Prior Publication Data

US 2010/0211556 A1    Aug. 19, 2010

(30) Foreign Application Priority Data

Feb. 13, 2009   (JP) ................................ 2009-032056

(51) Int. Cl.
*G06F 12/00* (2006.01)
*G06F 17/30* (2006.01)
*G11B 27/10* (2006.01)
*G11B 27/034* (2006.01)

(52) U.S. Cl.
CPC ...... *G11B 27/105* (2013.01); *G11B 2220/2541* (2013.01); *G11B 27/034* (2013.01)
USPC ........................................................ 707/822

(58) Field of Classification Search
None
See application file for complete search history.

(56) References Cited

U.S. PATENT DOCUMENTS

| 2004/0268043 A1* | 12/2004 | Hoshizawa et al. ............ 711/117 |
| 2005/0060279 A1* | 3/2005 | Xue ................................... 707/1 |
| 2005/0271358 A1* | 12/2005 | Inata et al. ........................ 386/52 |
| 2007/0285524 A1* | 12/2007 | Murata ........................ 348/220.1 |

FOREIGN PATENT DOCUMENTS

| JP | 2003-189074 A | 7/2003 |
| JP | 2006-79552 A | 3/2006 |
| JP | 2006-523882 A | 10/2006 |
| JP | 2007-11504 A | 1/2007 |
| JP | 2007-179492 A | 7/2007 |
| JP | 2008-98765 | 4/2008 |
| JP | 2008-159233 | 7/2008 |
| WO | WO 2006/030767 A1 | 3/2006 |
| WO | WO 2006/126679 A1 | 11/2006 |

OTHER PUBLICATIONS

Advanced Access Content System (AACS), "Recordable Video Book", http://www.aacsla.com/specifications/AACS_Spec_Recordable_Final_0_96.pdf, Revision 0.94, Feb. 12, 2007, 22 pages.

(Continued)

*Primary Examiner* — Usmaan Saeed
*Assistant Examiner* — Michele Choi
(74) *Attorney, Agent, or Firm* — Oblon, Spivak, McClelland, Maier & Neustadt, L.L.P.

(57) ABSTRACT

An information processing apparatus includes an application execution unit configured to generate data to be recorded onto a medium that records data or reproduce data from the medium, a file system unit configured to manage data recorded on the medium using a file system, and a file conversion unit configured to perform conversion between a first file format processable by the application execution unit and a second file format defined by the file system. The file conversion unit converts a file of the first file format generated by the application execution unit into a file of the second file format having an allowable size defined by the file system and supplies the converted file to the file system unit in the form of a file to be recorded.

6 Claims, 21 Drawing Sheets

(56) References Cited

OTHER PUBLICATIONS

Advanced Access Content System (AACS), "Blu-ray Disc Recordable Book", http://www.aacsla.com/specifications/AACS_Spec_BD_Recordable_Final_0.96.pdf, Revision 0.94 RC1, Feb. 12, 2008, 57 pages.

Advanced Access Content System (AACS), "Prepared Video Book", http://www.aacsla.com/specifications/AACS_Spec_Prepared_Video_Final_0.94.pdf, Revision 0.94, Feb. 12, 2008, 42 pages.

Advanced Access Content System (AACS), "Blu-ray Disc Prepared Video Book", http://www.aacsla.com/specifications/AACS_Spec_BD_Prepared_Final_0.94.pdf, Revision 0.94 RC1, Feb. 12, 2008, 49 pages.

* cited by examiner

FIG. 8

| | FILE SEPARATION / CONCATENATION RULE |
|---|---|
| (a) | FILE SEPARATION POINT IS SET SO AS TO BE MULTIPLE OF SECTOR BOUNDARY (2048 BYTES) FOR MEDIUM THAT EMPLOYS FIRST FILE SYSTEM (Blu-ray Disc) |
| (b) | FILE SEPARATION POINT IS SET SO AS TO BE MULTIPLE OF ALIGNED UNIT (6144 BYTES) OF CONTENT SUBJECTED TO ENCRYPTION PROCESS, WHICH IS UNIT OF CONTENT RECORDED IN MEDIUM THAT EMPLOYS FIRST FILE SYSTEM (Blu-ray Disc) |
| (c) | FILE SEPARATION POINT IS SET SO AS TO BE MULTIPLE OF 1 MB |
| (d) | FILE IS SEPARATED BY 3 GB |

FIG. 9

| | ORIGINAL FILE | FILE NAME CONVERSION RULE | |
|---|---|---|---|
| | | | SEPARATE FILES |
| (a) | [00001.mts] | SET EXTENSIONs xxx SO THAT xxx ARE SERIAL NUMBERS (SERIAL NUMBERS xxx CAN BE DECIMAL, HEXADECIMAL, OR BASE 36) EXAMPLES OF EXTENSIONs xxx (DECIMAL): [00001.001], [00001.002], [00001.003] ..., OR [00001.000], [00001.001], [00001.002] ... | |
| (b) | [00001.mts] | USE THE SAME EXTENSION (mts), AND APPEND SERIAL NUMBER (xx) TO FILENAME (SERIAL NUMBERS xx CAN BE DECIMAL, HEXADECIMAL, OR BASE 36) EXAMPLES OF SERIAL NUMBER SETTING (DECIMAL): [00001_01.mts], [00001_02.mts], [00001_03.mts] ..., OR [00001_00.mts], [00001_01.mts], [00001_02.mts] ... | |

INFORMATION PROCESSING APPARATUS, INFORMATION PROCESSING METHOD, AND PROGRAM

BACKGROUND OF THE INVENTION

1. Field of the Invention

The present invention relates to an information processing apparatus, an information processing method, and a program and, in particular, to an information processing apparatus, an information processing method, and a program that convert data into a file system format employed by a medium, such as a disk or a flash memory, and record and reproduce the data onto and from the medium.

For example, the present invention relates to an information processing apparatus, an information processing method, and a program that allow an application designed for recording and reproducing data in a format of a Blu-ray Disc™ file system to record and reproduce data onto and from a medium of a format other than a Blu-ray Disc™ file system format (such as a flash memory).

2. Description of the Related Art

A plurality of types of medium, such as a flash memory and a disk medium including a Blu-ray Disk™, have been used in order to record a television program using a recorder or a moving image captured by a video camera.

In order to manage data items recorded on such a data recording medium, a file system is used. A file system defines rules for ensuring data recording and reproduction using a medium. Examples of the rules include an amount of data per unit of data recorded in the medium, an amount of data per unit of data reproduced from the medium, a file structure or a directory structure, a correspondence between a real data item and a management data item, and a file name setting rule.

For example, FAT (File Allocation Table) and UDF (Universal Disk Format) generally used for an optical disk, such as a Blu-ray Disc™, are developed. Note that FAT is described in, for example, Japanese Unexamined Patent Application Publication No. 2008-262381, and UDF is described in, for example, Japanese Unexamined Patent Application Publication Nos. 2007-305171 and 2004-350251.

These file systems have rules specific to the file systems. For example, an amount of data per unit recorded in the medium, an amount of data per unit reproduced from the medium, and a file name setting rule differ from file system to file system. More specifically, FAT32 defines a maximum file size as 4 GB. However, in the UDF, a maximum file size is far larger than 4 GB.

A data recording and reproduction application running in an apparatus that uses a Blu-ray Disc™ as a data recording and reproduction medium generates data to be recorded and sets a file name in accordance with the rule defined by the UDF. Most of the files of recorded data generated by the UDF compliant application have a size far larger than 4 GB. Accordingly, data of the file generated by the application can be read or written from and to a UDF formatted medium (e.g., a Blu-ray Disc™). However, the data are unable to be written to a medium having a file system different from the UDF (e.g., a flash memory that employs the FAT).

SUMMARY OF THE INVENTION

Accordingly, the present invention provides an information processing apparatus, an information processing method, and a program that allow an application for generating data to be recorded and for reproducing the data using a particular file system to process data based on a different file system.

More specifically, the present invention provides an information processing apparatus, an information processing method, and a program that support recording media of different file systems (e.g., a Blu-ray Disc™ and a flash memory).

According to an embodiment of the present invention, an information processing apparatus includes an application execution unit configured to generate data to be recorded onto a medium that records data or reproduce data read from the medium, a file system unit configured to manage data recorded on the medium using a file system, and a file conversion unit configured to perform conversion between a first file format processable by the application execution unit and a second file format defined by the file system. The file conversion unit converts a file of the first file format generated by the application execution unit into a file of the second file format having an allowable size defined by the file system and supplies the converted file to the file system unit in the form of a file to be recorded.

The file conversion unit can separate a file of the first file format generated by the application execution unit into a plurality of files, each having an allowable maximum file size defined by the file system and supply the generated separate files to the file system unit in the form of files to be recorded.

The file conversion unit can assign a file name to each of the separate file names, and the file name can include information regarding a file name of the file separated into the separate files and information regarding arrangement of the separate file.

The file conversion unit can receive a data read request from the application execution unit and acquire the file names of separate files recorded on the medium using a file name contained in the data read request, and the file conversion unit can output, to the file system unit, a read request having parameters representing the acquired file names of separate files.

The file conversion unit can concatenate a plurality of separate files read from the medium by the file system unit, generate a readout file requested by the application execution unit, and supply the generated readout file to the application execution unit.

The file conversion unit can receive the file read from the medium and subjected to editing processing performed by the application execution unit and convert the file. When the editing processing will result in data deletion, the file conversion unit can identify a file to be edited having the second format and including data to be deleted by the data deletion, and the file conversion unit can perform a file conversion process including at least one of updating of the file to be edited and deleting of the file to be edited in accordance with a data state after the data deletion and supply the edited file to the file system unit as a file to be recorded.

The file conversion unit can receive the file read from the medium and subjected to editing processing performed by the application execution unit and convert the file. When the editing processing will result in data insertion, the file conversion unit can identify a file to be edited having the second format and including data to be inserted by the data insertion, and the file conversion unit can perform a file conversion process including at least one of updating of the file to be edited and generating of a new file having the second file format in accordance with a data state after the data insertion and supply the edited file to the file system unit as a file to be recorded.

According to another embodiment of the present invention, an information processing method for use in an information processing apparatus is provided. The method includes the steps of generating data to be recorded onto a medium that records data or reading data from the medium and reproducing data using an application execution unit of the information processing apparatus, performing conversion between a first file format processable by the application execution unit and a second file format defined by a file system employed by the medium using a file conversion unit of the information processing apparatus, and recording, onto the medium, a file generated in the step of performing conversion between the first file format and the second file format and having the second file format using a media interface of the information processing apparatus. The step of performing conversion between the first file format and the second file format involves converting a file of the first file format generated by the application execution unit into a file of the second file format having an allowable size defined by the file system and supplying the converted file to a file system unit of the information processing apparatus in the form of a file to be recorded.

According to still another embodiment of the present invention, a program for causing an information processing apparatus to perform information processing is provided. The program includes the steps of generating data to be recorded onto a medium that records data or reproduce data from the medium using an application execution unit of the information processing apparatus, performing conversion between a first file format processable by the application execution unit and a second file format defined by a file system employed by the medium using a file conversion unit of the information processing apparatus, and recording, onto the medium, a file generated in the step of performing conversion between the first file format and the second file format and having the second file format using a media interface of the information processing apparatus. The step of performing conversion between the first file format and the second file format involves converting a file of the first file format generated by the application execution unit into a file of the second file format having an allowable size defined by the file system and supplying the converted file to a file system unit of the information processing apparatus in the form of a file to be recorded.

Note that by using a computer-readable recording medium or a communication medium, the program can be provided to, for example, an image processing apparatus or a computer system that can execute a variety of program code. By providing such a program in a computer-readable format, the processes in accordance with the program can be performed in the image processing apparatus or a computer system.

Further features and advantages of the present invention will become apparent from the following detailed description of exemplary embodiments with reference to the attached drawings. In addition, as used herein, the term "system" refers to a logical combination of a plurality of devices; the plurality of devices is not necessarily included in one body.

According to the embodiments of the present invention, when a file generated by the application execution unit does not comply with the specification of a file system employed by a recording medium, the file conversion unit is provided between the application execution unit and the file system unit that manages data recorded onto the medium. The file conversion unit converts the file generated by the application execution unit into a file having a file format allowable by the file system and supplies the converted file to the file system unit as a file to be recorded. This configuration allows data to be recorded or reproduced even in a configuration in which a file system employed by the application execution unit differs from a file system employed by the data recording medium.

BRIEF DESCRIPTION OF THE DRAWINGS

FIG. 8 illustrates the rules applied to a file separation process and the file concatenation process;

FIG. 9 illustrates the file name conversion rule;

DESCRIPTION OF THE PREFERRED EMBODIMENTS

Figure 1:
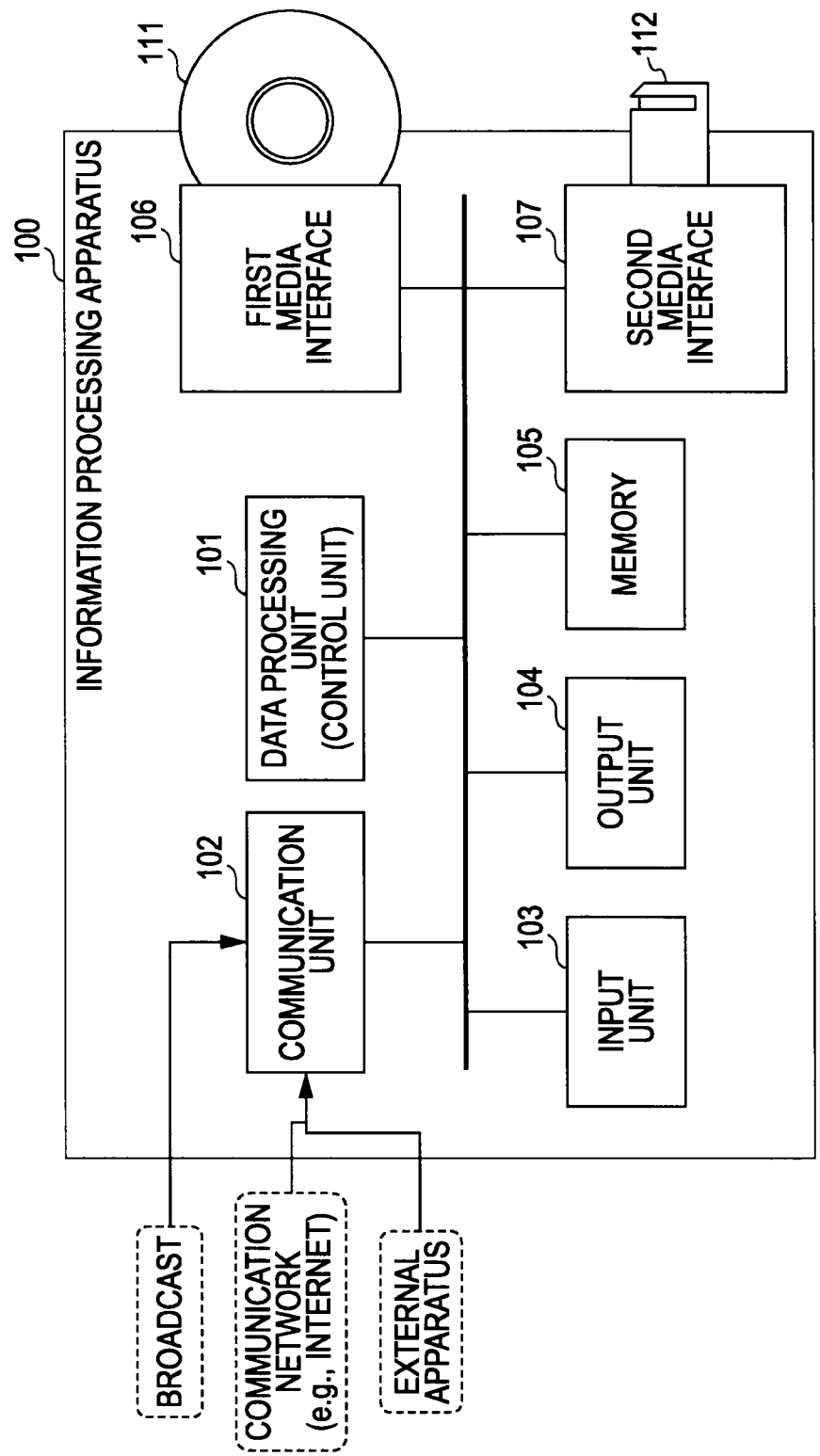
FIG. 1 is a block diagram of an exemplary configuration of an information processing apparatus according to an embodiment of the present invention.

An information processing apparatus, an information processing method, and a program according to embodiments of the present invention are described in detail below with reference to the accompanying drawings. The descriptions are made in the following order:

1. Configuration and Outline of Processing of Information Processing Apparatus
2. Structure of Data Recorded on First Medium (Blu-ray Disc™)
3. Data Recording and Reproduction Process onto and from Medium with File Separation Process and File Concatenation Process
4. File Separation Process, File Concatenation Process, and File Name Conversion Rule
5. Data Storing Structure of Second Medium and File Recognized by Application in File Conversion Process
6. File Conversion Process Performed during File Editing
7. Other Exemplary Configurations of Information Processing Apparatus 1. Configuration and Outline of Processing of Information Processing Apparatus An exemplary configuration of an information processing apparatus according to an embodiment of the present invention and exemplary processing performed by the information processing apparatus are described first. FIG. 1 is a block diagram of an exemplary configuration of an information processing apparatus 100 according to an embodiment of the present invention. The information processing apparatus 100 is a data recording and reproduction apparatus that uses, for example, a Blu-ray Disc™ as a main recording medium (a first medium 111). For example, the information processing apparatus 100 records, onto the first medium 111 (e.g., a Blu-ray Disc™), data received through a broadcast program or a network, such as the Internet, or data input through an externally connected apparatus. In addition, the information processing apparatus 100 reproduces data recorded on the first medium 111. Examples of the information processing apparatus 100 include a recorder, a video camera, and a personal computer (PC).

The information processing apparatus 100 further uses a second medium 112 mounted therein. Data is recorded onto the second medium 112 and is managed by using a file system different from that of the first medium 111. An example of the second medium 112 is a flash memory. Like the processing for the first medium 111, the information processing apparatus 100 records and reproduces data onto and from the second medium 112.

As shown in FIG. 1, the information processing apparatus 100 includes a data processing unit (control unit) 101, a communication unit 102, an input unit 103, an output unit 104, a memory 105, a first media interface 106, and a second media interface 107.

The data processing unit 101 includes a central processing unit (CPU) having a program execution function of executing a variety of data processing programs. For example, the data processing unit 101 executes an application program that performs data recording and reproduction operations. The data processing unit 101 records data, such as broadcast data received through the communication unit 102, onto a medium and reproduces data recorded on the medium.

The communication unit 102 receives an airwave broadcast signal, performs communication over the Internet, or performs communication with an external apparatus. The input unit 103 serves as, for example, a user operation unit. The input unit 103 accepts a variety of input operations, such as an input of data recording instruction or a data reproduction instruction. Note that the input unit 103 can be operated by remote control and receive remote control information. The output unit 104 includes a display and a speaker. The output unit 104 outputs an image and sound. The memory 105 includes a random access memory (RAM) and a read only memory (ROM). The memory 105 is used as an area for storing an application program (hereinafter simply referred to as an "application") executed by the data processing unit 101. The memory 105 is further used as a parameter area and a work area of the application. Still furthermore, the memory 105 is used as a buffer area of data to be recorded onto a medium.

The first media interface 106 is used when data is recorded and reproduced onto and from the first medium 111 (e.g., a Blu-ray Disc™). In response to a request received from the data processing unit 101, the first media interface 106 writes data onto the first medium 111 or reads data recorded on the first medium 111. The second media interface 107 is used when data is recorded and reproduced onto and from the second medium 112 (e.g., a flash memory). In response to a request received from the data processing unit 101, the second media interface 107 writes data onto the second medium 112 or reads data recorded on the second medium 112.

Data management using a first file system (e.g., UDF) is performed for the first medium 111. In contrast, data management using a second file system (e.g., File Allocation Tables 32 (FAT32)) is performed for the second medium 112.

A data recording and reproduction application executed by the data processing unit 101 performs data processing in accordance with only one of the two different file systems. In this example, the data recording and reproduction application performs data processing in accordance with the first file system (e.g., UDF) employed by the first medium 111 (e.g., a Blu-ray Disc™).

That is, a recording file generated by the application executed in the data processing unit 101 is a data file that has a data size and a file name that are compatible with UDF. In addition, when reproducing data, the data processing unit 101 performs processing in accordance with the data size and the file name that are compatible with UDF.

Accordingly, when performing data recording and reproduction processing using the first medium 111, the data recording and reproduction application executed in the data processing unit 101 can perform the processing without any problem.

However, it is difficult for the data recording and reproduction application alone to record and reproduce data onto and from the second medium 112 (e.g., a flash memory) that employs the second file system (e.g., FAT32).

Therefore, according to the present embodiment, in order to record and reproduce data onto and from the second medium 112, the information processing apparatus performs a file conversion process using the data processing unit 101. The processing performed by the data processing unit 101 is described in detail next with reference to FIG. 2.

Figure 2:
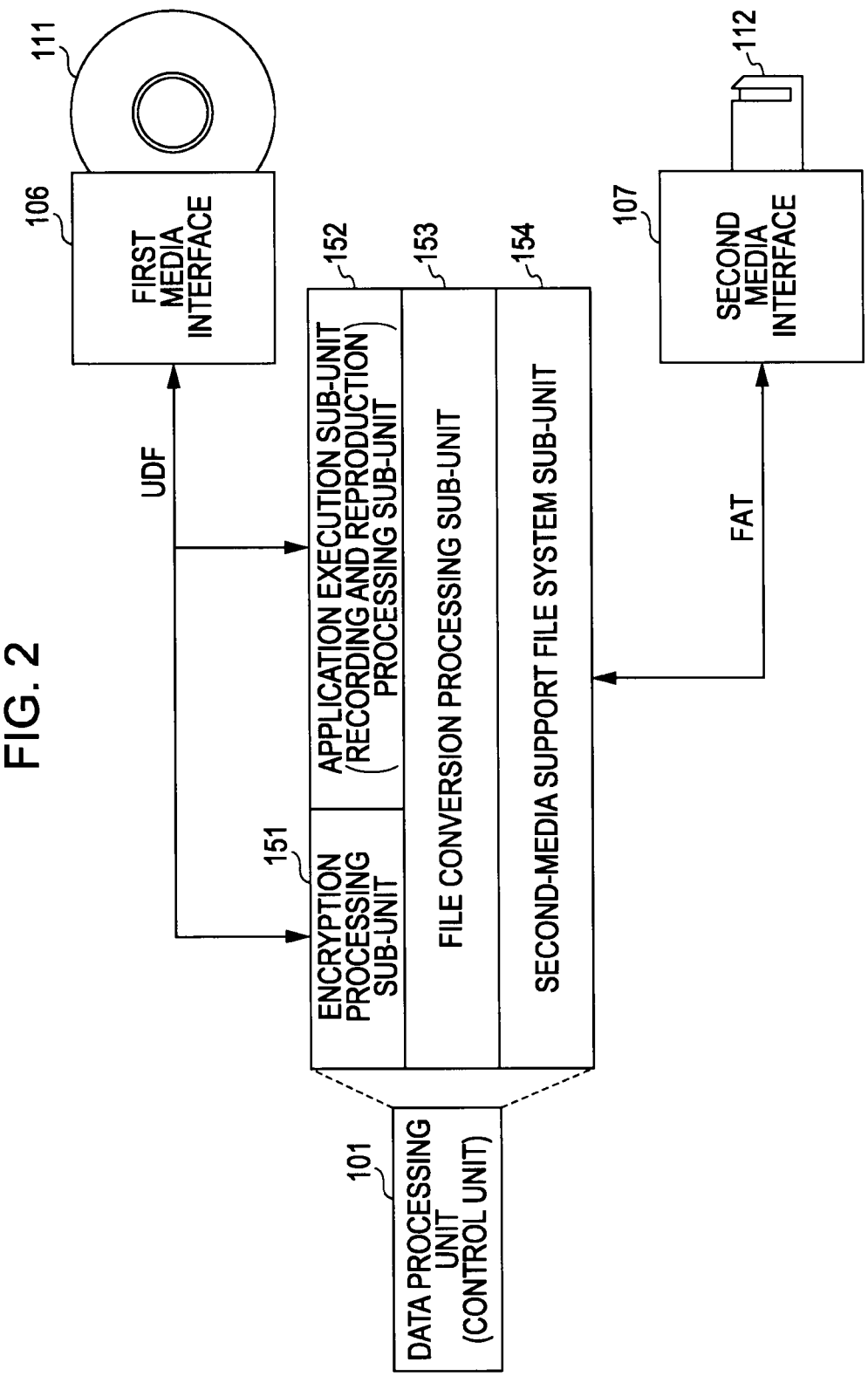
FIG. 2 illustrates the processing structure of a data processing unit of the information processing apparatus.

FIG. 2 illustrates a plurality of separate processes performed by the data processing unit 101. As shown in FIG. 2, the data processing unit 101 includes an encryption processing sub-unit 151, an application execution sub-unit (a recording and reproduction processing sub-unit) 152, a file conversion processing sub-unit 153, a second-media support file system sub-unit 154.

Among these sub-units, the encryption processing sub-unit 151 and the application execution sub-unit (the recording and reproduction processing sub-unit) 152 perform processing using the first file system (e.g., UDF) employed by the first medium 111 and, more specifically, in accordance with the unit of processing data, the file size, and the file name convention defined by the first file system.

The encryption processing sub-unit 151 encrypts data to be recorded onto a medium or decrypts encrypted data read from a medium. More specifically, for example, the encryption processing sub-unit 151 performs encrypting and decrypting processing in accordance with the Advanced Access Content System (AACS), which is a standard for content distribution and digital rights management. According to the specification of the AACS, content is separated into units (CPS units), and each of the units is encrypted using an encryption key (a CPS unit key). This AACS standard is designed for the encryption process structure used when content is recorded onto a Blu-ray Disc™, which is the first medium 111. The unit of data subjected to the encryption process performed by the encryption processing sub-unit 151 complies with the unit of data to be recorded of a Blu-ray Disc™.

In addition, the application execution sub-unit 152 performs processing in accordance with the standard of the first file system (e.g., UDF) employed by the first medium 111. Accordingly, the size and name of a data file to be recorded comply with the specification of the first file system.

The second-media support file system sub-unit 154 manages data when data is recorded and reproduced onto and from the second medium 112. The second-media support file system sub-unit 154 writes or reads data onto and from the second medium 112 that employs, for example, FAT32.

The file conversion processing sub-unit 153 converts a data format used for the encryption processing sub-unit 151 and the application execution sub-unit 152 that use the first file system into a data format used for the second-media support file system sub-unit 154 that writes and reads data using the second file system and vice versa.

For example, the file conversion processing sub-unit 153 performs the following processes.

When recording data generated or processed by the encryption processing sub-unit 151 or the application execution sub-unit 152 onto the second medium 112, the file conversion processing sub-unit 153 converts the data format of the data received from the encryption processing sub-unit 151 or the application execution sub-unit 152 into a format that satisfies the specification of the second file system employed by the second medium 112. Thereafter, the file conversion processing sub-unit 153 supplies the converted data to the second-media support file system sub-unit 154.

In addition, when reading data recorded on the second medium 112 and supplying the data to the encryption processing sub-unit 151 or the application execution sub-unit 152, the file conversion processing sub-unit 153 converts the data format of the data read from the second medium 112 by the second-media support file system sub-unit 154 into a format that satisfies the specification of the first file system. Thereafter, the file conversion processing sub-unit 153 supplies the converted data to the encryption processing sub-unit 151 or the application execution sub-unit 152.

Figure 3:
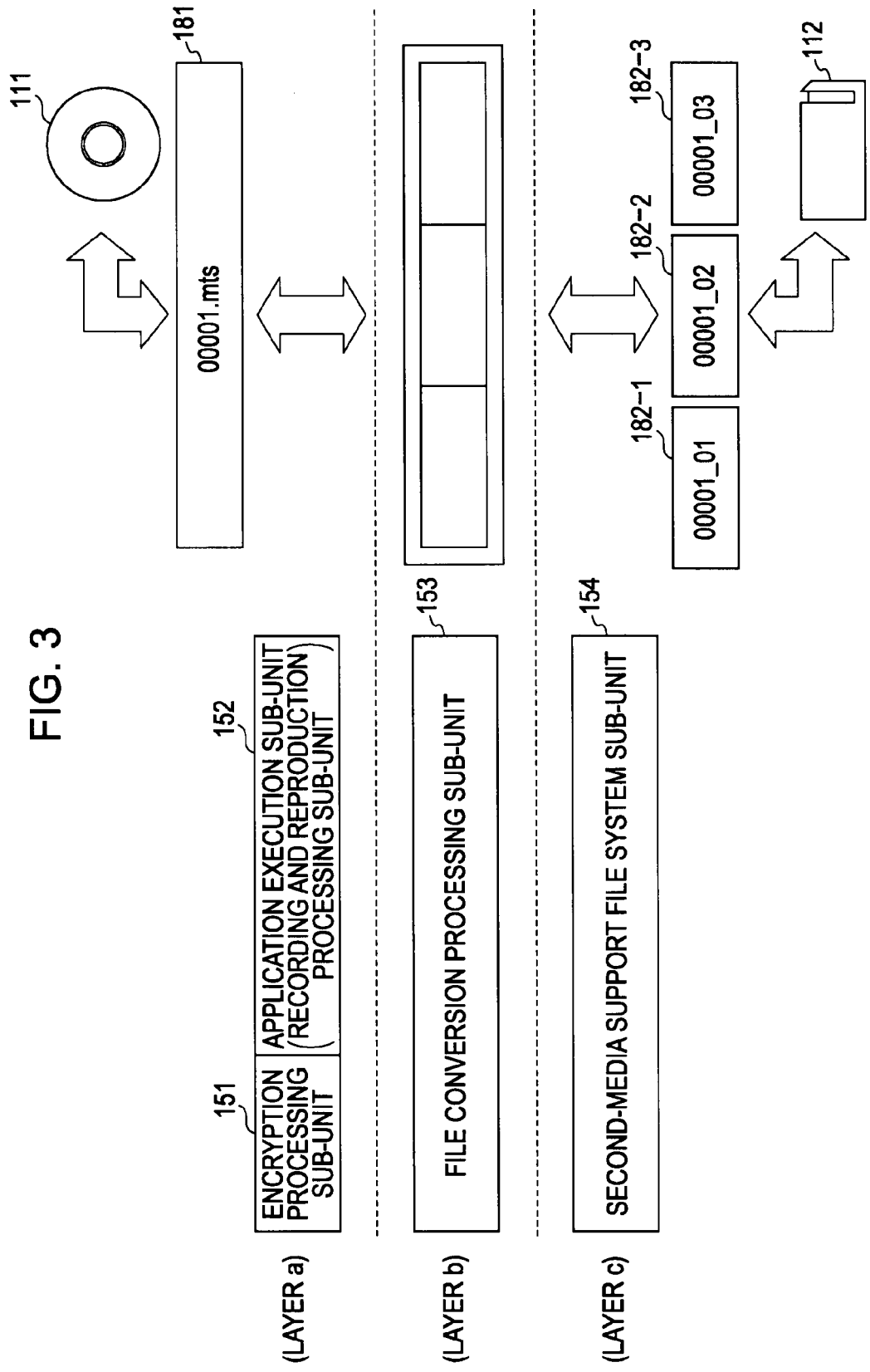
FIG. 3 illustrates a file conversion process performed by the file processing unit of the information processing apparatus.

An example of the processing performed by the file conversion processing sub-unit 153 is described in more detail with reference to FIG. 3. FIG. 3 illustrates the data processing unit 101 separated into the following three layers:

(Layer a) the encryption processing sub-unit 151 and the application execution sub-unit 152, (Layer b) the file conversion processing sub-unit 153, and (Layer c) the second-media support file system sub-unit 154.

In Layer a, the encryption processing sub-unit 151 and the application execution sub-unit 152 perform processing in accordance with the specification of the first file system employed by the first medium 111. A recording file 181 [00001.mts] for the first medium 111 is illustrated in FIG. 3. This file represents an MPEG transport stream file serving as a moving picture content recording file that complies with the first file system (UDF in the present embodiment) specification.

In Layer c, the second-media support file system sub-unit 154 performs processing in accordance with the specification of the second file system employed by the second medium 112. Three recording files 182-1 to 182-3 ([00001_01] to [00001_03]) for the second medium 112 are illustrated in FIG. 3.

In Layer b, the file conversion processing sub-unit 153 is disposed between the layer a (the encryption processing sub-unit 151 and the application execution sub-unit 152) and the layer c (the second-media support file system sub-unit 154). When a file is exchanged between the layers a and c, the file conversion processing sub-unit 153 converts the file format so that the file is processable in each of the layers. More specifically, the file conversion processing sub-unit 153 converts the file size and the file name.

For example, suppose that the second file system employed by the second medium 112 is the FAT32 while the first file system employed by the first medium 111 is the UDF. The maximum file size defined by FAT32 is 4 GB, while the maximum file size defined by UDF is a value far larger than 4 GB.

In such a case, when recording the data generated by the encryption processing unit 151 or the application execution unit 152 onto the second medium 112, the file conversion processing unit 153 splits the data file generated by the encryption processing unit 151 or the application execution unit 152 into a plurality of separate files each having a size smaller than or equal to 4 GB. The file conversion processing unit 153 then supplies the plurality of separate files to the second-media support file system unit 154 as files to be recorded.

That is, the data file generated by the encryption processing sub-unit 151 or the application execution sub-unit 152 is the file [00001.mts] shown in FIG. 3. This file 181 has a size that complies with the size limit of the first file system and that is far larger than 4 GB. In order to record this file onto the second medium 112 which employs the second file system (i.e., FAT32), the file conversion processing sub-unit 153 generates a plurality of files each having a size smaller than or equal to 4 GB. That is, for example, the file conversion processing sub-unit 153 generates three recording files 182-1 to 182-3 ([00001_01] to [00001_03]), as shown in FIG. 3, and supplies the generated files to the second-media support file system sub-unit 154.

In addition, when the second-media support file system sub-unit 154 supplies a file read from the second medium 112 to the encryption processing sub-unit 151 or the application execution sub-unit 152, the file conversion processing sub-unit 153 performs the following processing. That is, the file conversion processing sub-unit 153 concatenates the three recording files 182-1 to 182-3 ([0000101] to [00001_03]), each having a size smaller than or equal to 4 GB, shown in FIG. 3 and restores an unseparated original file. That is, the file conversion processing sub-unit 153 restores the file [00001.mts] shown in FIG. 3 and supplies the restored file to the encryption processing sub-unit 151 or the application execution sub-unit 152. Such processing is described in more detail below.

2. Structure of Data Recorded on First Medium (Blu-ray Disc™)

Figure 4:
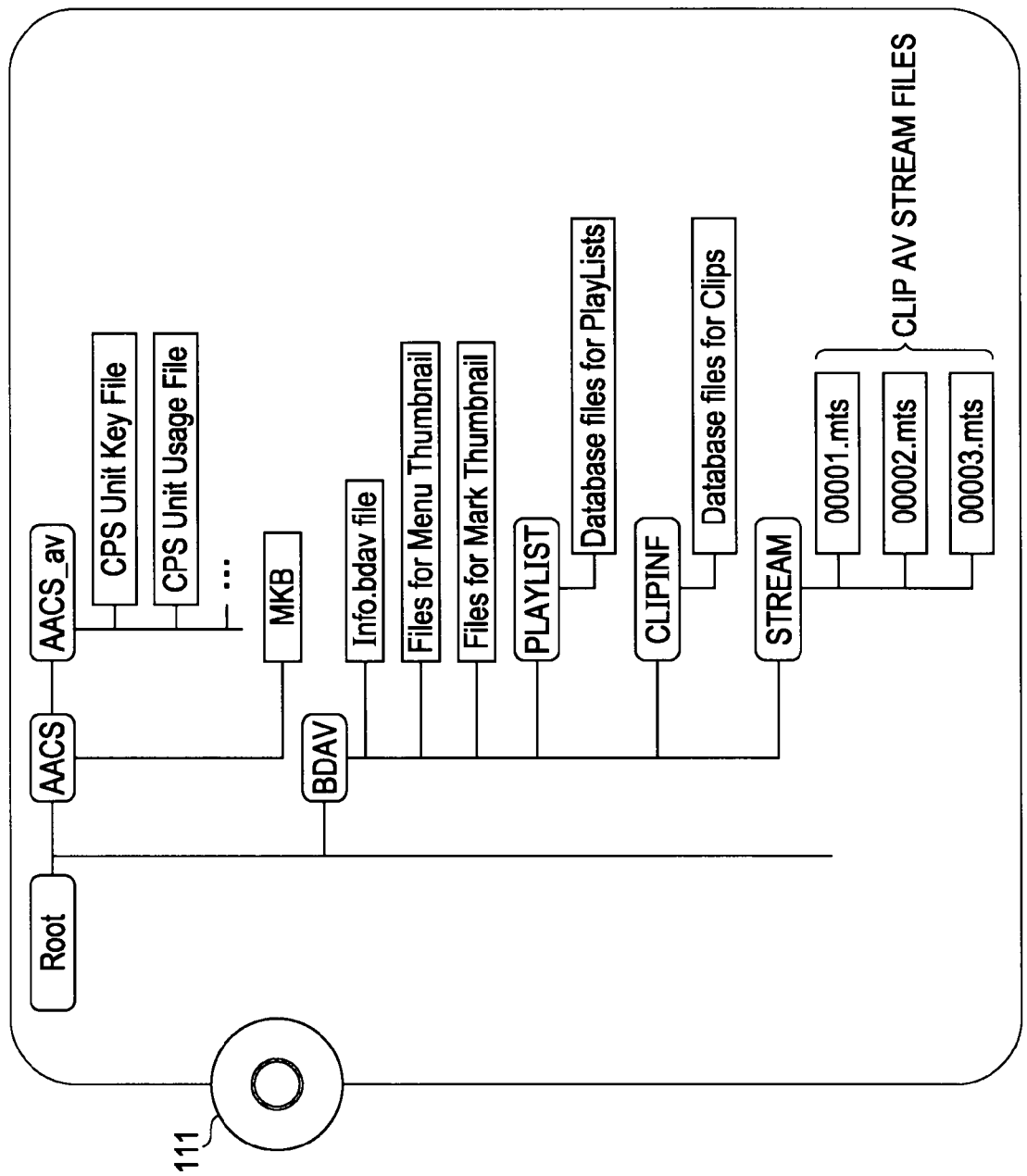
FIG. 4 illustrates an example of the data structure of data recorded on a first medium.

The structure of data recorded on the first medium (Blu-ray Disc™) is described next with reference to FIG. 4. FIG. 4 illustrates an exemplary directory structure of a data file to be recorded onto the first medium (Blu-ray Disc™)

Directories [AACS] and [BDAV] are generated immediately beneath the root directory [Root]. The [AACS] directory stores, for example, encryption key information defined by the specification of the above-described AACS. More specifically, a CPS unit key file that contains key information used for encryption and decryption of content to be recorded onto a medium and a media key block (MKB) file which is a key block used for acquiring a key from a CPS unit key are set in the [AACS] directory.

The [BDAV] directory is a directory in which actual data of recorded content and reproduction control information used for a reproduction process are set. More specifically, the [BDAV] directory contains index information (info.bdav.file) including the title of the content, a menu thumbnail (Files for Menu.Thumbnail) including still image content, a playlist (PLAYLIST) serving as reproduction control information regarding moving image content, clip information (CLIPINF), and a stream (STREAM) which is actual data of the content. For example, a file containing the actual data of the recorded content (a stream file) is recorded in the stream directory (STREAM).

Each of [00001.mts] to [00003.mts] shown in FIG. 4 is a stream file. These files correspond to MPEG transport stream files defined by the first file system (UDF in the present embodiment).

The playlist contains play items each of which specifies data to be reproduced. A play item corresponds to a clip information item including reproduction span information. By using the playlist, a particular clip information item is selected. In addition, the clip information item contains reproduction span indication information regarding stream data serving as the actual data of content. Using the clip information, stream data is selectively read, and a stream reproduction process is performed.

As illustrated in FIG. 3, the file conversion processing sub-unit 153 performs a file separation process and a file concatenation process. However, the file separation process or the file concatenation process is not applied to all of the files to be recorded onto the first medium 111 shown in FIG. 4. If a file to be recorded onto the first medium 111 has a size smaller than or equal to 4 GB, which is a maximum file size of the second file system (FAT32), the file separation process and the file concatenation process are not necessary. The file separation process and the file concatenation process are applied to only files having a large size among the files generated by the encryption processing sub-unit 151 or the application execution sub-unit 152. That is, the file separation process and the file concatenation process are applied to only files having a size larger than 4 GB, which is a maximum file size of the second file system (FAT32).

In the directory structure shown in FIG. 4, a file that may have a size larger than 4 GB (i.e., the maximum file size of FAT32) is a stream file representing the actual data of content. The other files, such as the files representing the AACS directory setting data, the index information (info.bday.file), the menu thumbnails (Files for Menu.Thumbnail), the playlist (PLAYLIST), and the clip information (CLIPINF), have a size smaller than or equal to 4 GB.

Each of the stream files [00001.mts], [00002.mts], and [00003.mts] shown in FIG. 4 may have a size larger than 4 GB. When these files are recorded onto the second medium 112, the file conversion processing sub-unit 153 shown in FIG. 3 separates the files. In addition, when separate stream files recorded on the second medium 112 are supplied to the encryption processing sub-unit 151 or the application execution sub-unit 152, the file conversion processing sub-unit 153 concatenates the separate files into one file.

3. Data Recording and Reproduction Process onto and from Medium with File Separation Process and File Concatenation Process A data recording process and a data reproduction process onto and from a medium with a file separation process and a file concatenation process are described next.

As described above, when data generated by the encryption processing sub-unit 151 or the application execution sub-unit 152 that performs data processing in accordance with the first file system employed by the first medium 111 is recorded onto the second medium 112, the data is converted into data that complies with the specification of the second file system.

In the following descriptions, it is assumed that the first file system is UDF, and the second file system is FAT32. However, the present embodiment is not limited to such a combination. The present embodiment is applicable to the processing in which the processing performed in the application execution sub-unit differs from the processing that uses the file system employed by a medium in use (the second medium in the present embodiment).

As described above, the maximum file size defined by FAT32 is 4 GB, while the maximum file size defined by UDF is a value far larger than 4 GB.

The outline of the processing performed by the file conversion processing sub-unit 153 is as follows.

That is, when performing a data recording and reproduction process or a data editing process using the second medium 112, the application execution sub-unit 152 or the encryption processing sub-unit 151 separates a file or concatenates files so as to maintain the maximum file size limitation (4 GB) defined by the second file system (FAT32) employed by the second medium 112.

Note that, in the present embodiment, in general, a file that is processed by the application execution sub-unit 152 or the encryption processing sub-unit 151 and that may have a size larger than 4 GB is a stream file which contains the actual data of content. Accordingly, the file conversion processing sub-unit 153 performs a file conversion process, including a file separation process or a file concatenation process, on a stream file. In contrast, the file conversion processing sub-unit 153 does not perform the file conversion process on a file other than a stream file, that is, a file having a size smaller than or equal to 4 GB (e.g., a management file or a reproduction control file).

The file conversion process further includes a file name conversion process. That is, as shown in FIG. 3, a file name is converted between the file name [00001.mts] of the original file 181 that is processed by the application execution sub-unit 152 or the encryption processing sub-unit 151 and that has a size larger than 4 GB and the names [00001_01] to [00001_03] of the separate files 182-1 to 182-3 for the second medium 112.

The processing performed by the file conversion processing sub-unit 153 is schematically described with reference to the following two cases:

(A) a process performed when data is recorded onto the second medium 112, and (B) a process performed when data is reproduced from the second medium 112.

(A) Process Performed when Data is Recorded onto Second Medium 112

In order to record data onto the second medium 112, the file conversion processing sub-unit 153 performs the following processes:

(a1) separating stream data having a size larger than the maximum file size defined by the second file system, (a2) assigning a file name to each of a separate files, and (a3) delivering the separate files to the second-media support file system sub-unit 154.

(B) Process Performed when Data is Reproduced from Second Medium 112

The file conversion processing sub-unit 153 examines from which separate files a stream file requested by the application execution sub-unit 152 or the encryption processing sub-unit 151 is formed. The file conversion processing sub-unit 153 then reads the separate files and concatenates the read separate files into one file. Thereafter, the file conversion processing sub-unit 153 delivers the concatenated file to the application execution sub-unit 152 or the encryption processing sub-unit 151.

For example, when the application execution sub-unit 152 requests playing back of content from a specified point of time, the file conversion processing sub-unit 153 converts information indicating the byte position in the concatenated file into the byte position in the separate file. Note that conversion from the specified point of time into the byte position in the concatenated file is performed in an application layer. More specifically, the following sequence of processes is performed:

(b1) determining, using the stream file name and the byte position in the file, from which byte position of which separate file data reproduction is to be started, (b2) submitting an instruction to read data from the byte position in the separate file to the second-media support file system sub-unit 154, and (b3) delivering the data read out by the second-media support file system sub-unit 154 to the application execution sub-unit 152 or the encryption processing sub-unit 151.

Figure 5:
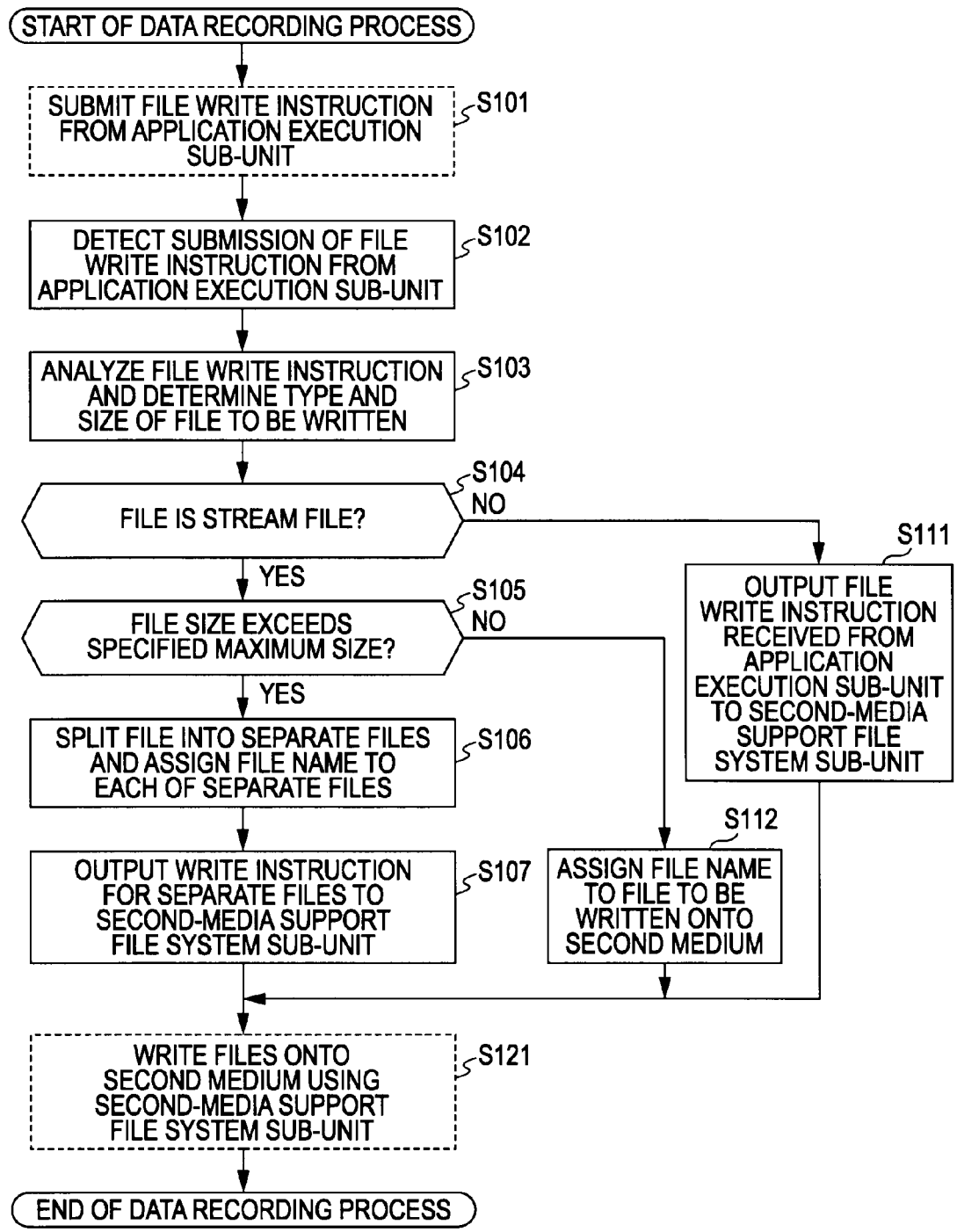
FIG. 5 is a flowchart illustrating a sequence of processes performed by a file conversion processing unit when data is recorded onto a second medium.
Figure 6:
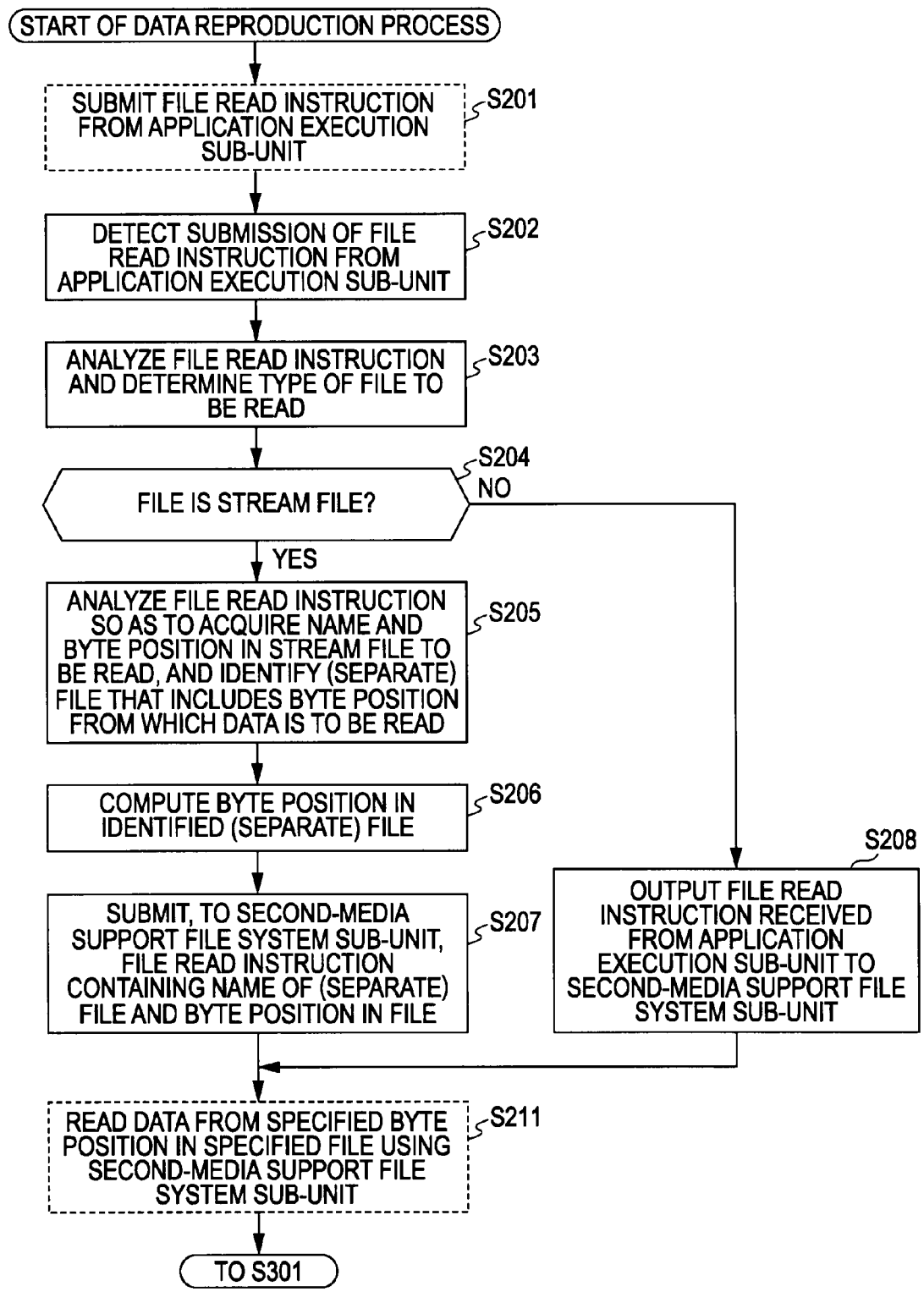
FIG. 6 is a flowchart illustrating a processing sequence performed by the file conversion processing unit when data is reproduced from the second medium.
Figure 7:
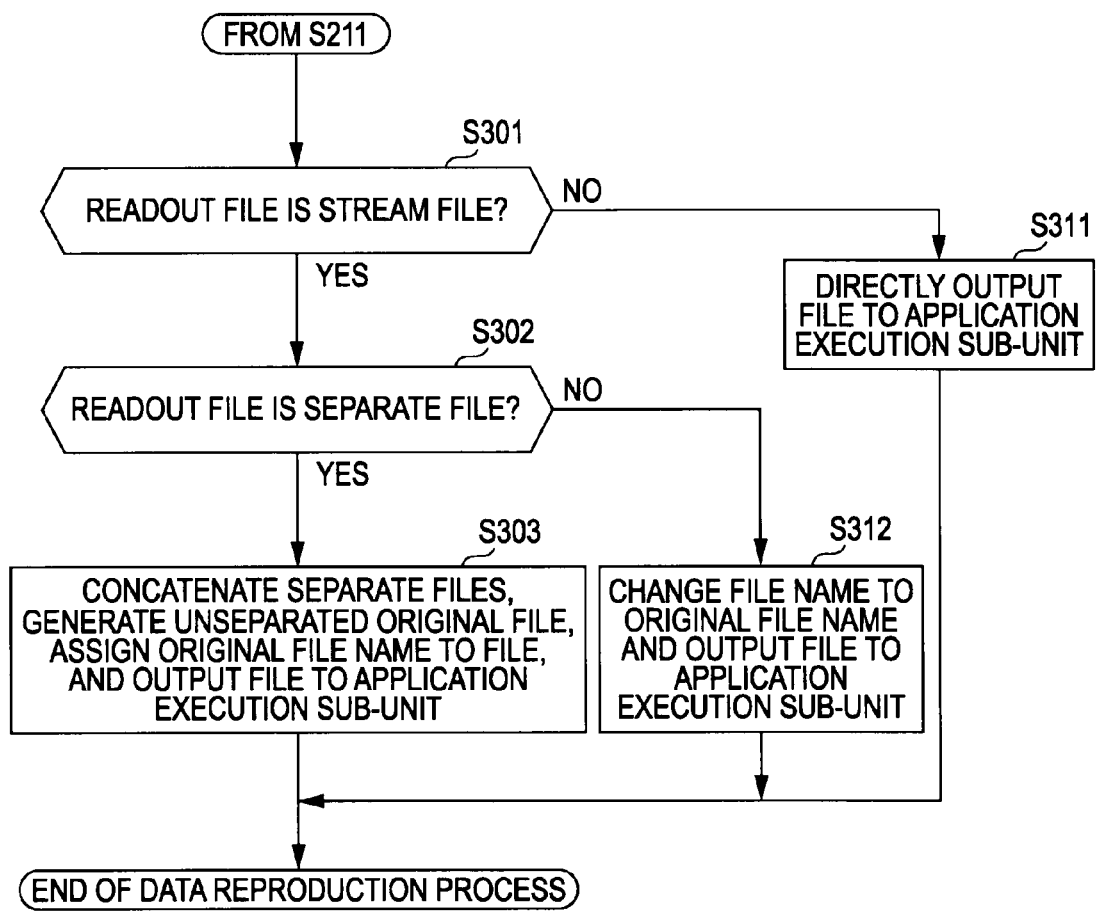
FIG. 7 is a continuation of the flowchart shown in FIG. 6.

The sequence of processes performed by the file conversion processing sub-unit 153 is described in detail next with reference to the flowchart illustrated in FIGS. 5 to 7. FIG. 5 illustrates a processing flow when data is recorded onto the second medium 112. FIGS. 6 and 7 illustrate a processing flow when data is reproduced from the second medium 112. That is, FIGS. 5 to 7 illustrate the sequence of processes performed by the file conversion processing sub-unit 153 when the file conversion processing sub-unit 153 performs such processing.

The processing performed by the file conversion processing sub-unit 153 when data is recorded onto the second medium 112 is described first with reference to the flowchart illustrated in FIG. 5. Note that the processing flow illustrated in FIG. 5 represents the sequence of an initial recording process of a file generated by the application execution sub-unit 152. That is, a different process is performed when data recorded on the second medium 112 is edited by the application execution sub-unit 152 and is re-recorded onto the second medium 112. The editing process is described below.

In the flowchart shown in FIG. 5, the process in step S101 is performed by the application execution sub-unit 152. The processes in steps S102 to S112 are performed by the file conversion processing sub-unit 153. The process in step S121 is performed by the second-media support file system sub-unit 154.

First, in step S101, the application execution sub-unit 152 submits a file write processing instruction. Note that this processing flow is performed when a medium to which data is written is the second medium. More specifically, in step S101, the application execution sub-unit 152 submits a file write processing instruction having a parameter indicating the name of a file to be written.

In step S102, the file conversion processing sub-unit 153 detects the file write processing instruction submitted by the application execution sub-unit 152.

In step S103, the file conversion processing sub-unit 153 analyzes the file write processing instruction submitted by the application execution sub-unit 152 and recognizes the type and size of a file to be written.

If, in step S104, the file conversion processing sub-unit 153 determines that the type of the file is a stream file, the processing proceeds to step S105. However, if, in step S104, the file conversion processing sub-unit 153 determines that the type of the file is not a stream file, the processing proceeds to step S111, where the file write processing instruction received from the application execution sub-unit 152 is directly output to the second-media support file system sub-unit 154.

As noted above, it is ensured that a file other than a stream file has a size smaller than or equal to the maximum size allowed by the file system employed by the second medium (4 GB). Accordingly, a write instruction of a file other than a stream file is directly output to the second-media support file system sub-unit 154. Thereafter, the processing proceeds to step S121, where the second-media support file system sub-unit 154 directly uses the write instruction generated by the application execution sub-unit 152 and writes data to the second medium.

However, if, in step S104, the file conversion processing sub-unit 153 determines that the type of the file is a stream file, the processing proceeds to step S105. When the type of the file is a stream file, the file size may be larger than the maximum size allowed by the file system employed by the second medium (4 GB). In such a case, the file size is determined in step S105.

If the file size is larger than the maximum file size allowed by the file system employed by the second medium (4 GB), the processing proceeds to step S106. However, the file size is not larger than the maximum file size, the processing proceeds to step S112.

In step S112, a file name is assigned to a file to be written having a size smaller than or equal to the allowable maximum file size (4 GB). Note that the file conversion processing sub-unit 153 converts the file name of the file (the original file) generated by the application execution sub-unit 152 into the name of a file to be recorded onto the second medium in accordance with a predetermined rule. An example of the conversion process is described in more detail below.

For example, when the file name is set, the file name conversion process is performed in step S112 so as to satisfy the following conditions:

(a) setting a file name that is allowed by the second file system employed by the second medium, and (b) setting identification information indicating that the file generated by the application execution sub-unit 152 (the original file) is not separated.

After the file name is set in step S112, the processing proceeds to step S121, where the second-media support file system sub-unit 154 writes the file onto the second medium using the file name set in step S112. Note that the file name conversion may be performed only when the file has been separated. If the file has not been separated, the setting may be made so that no file name conversion is performed.

If, in step S105, it is determined that the file size is larger than the allowable maximum file size of the file system employed by the second medium (4 GB), the processing proceeds to step S106. In step S106, the file is separated, and a file name is set for each of the separate files. That is, a plurality of separate files each having a size smaller than or equal to the allowable maximum file size of the file system employed by the second medium (4 GB) are generated, and a file name is set for each of the generated separate files.

Note that, as described above, the file conversion processing sub-unit 153 converts the file name of the file (the original file) generated by the application execution sub-unit 152 into the name of a file to be recorded onto the second medium in accordance with a predetermined rule. In addition, when performing a file separating process, the file conversion processing sub-unit 153 separates a file in accordance with a predetermined rule. For example, the file conversion processing sub-unit 153 assigns, to each of a plurality of separate files, a file name including the identification information regarding the original file and the arrangement information regarding the separate file. The file name setting rule and the separation rule are described in more detail below.

For example, the file name setting rule for a separate file satisfies the following conditions:

(a) setting a file name that is allowed by the second file system employed by the second medium for the separate file, and (b) setting a file name including identification information indicating that the file is generated from a file (an original file) generated by the application execution sub-unit 152 through a file separation process.

After the file name is set in step S106, the processing proceeds to step S107.

In step S107, the file conversion processing sub-unit 153 outputs, to the second-media support file system sub-unit 154, a file write instruction having a parameter indicating the file names assigned to the separate files. In step S121, the second-media support file system sub-unit 154 writes all of the separate files onto the second medium using the file names assigned to the separate files in step S106.

An exemplary processing performed by the file conversion processing sub-unit 153 when data recorded on the second medium 112 is reproduced is described next with reference to FIGS. 6 and 7. In the flowchart shown in FIG. 6, the process in step S201 is performed by the application execution sub-unit 152, the process in steps S202 through S208 is performed by the file conversion processing sub-unit 153, and the process in step S211 is performed by the second-media support file system sub-unit 154.

First, in step S201, the application execution sub-unit 152 submits a file read instruction. Note that this processing flow is applied to the case in which a medium to be read is the second medium. In step S201, the application execution sub-unit 152 submits the file read instruction having parameters indicating the file name of a file to be read and the byte position corresponding to the read start position in the file.

In step S202, the file conversion processing sub-unit 153 detects the file read instruction submitted from the application execution sub-unit 152.

Subsequently, in step S203, the file conversion processing sub-unit 153 analyzes the file read instruction submitted from the application execution sub-unit 152 and determines the file type of the file to be read.

If, in step S204, the file conversion processing sub-unit 153 determines that the file type indicates a stream file, the processing proceeds to step S205. However, in step S204, the file conversion processing sub-unit 153 determines that the file type does not indicate a stream file, the processing proceeds to step S208, where the file conversion processing sub-unit 153 directly outputs the file read instruction received from the application execution sub-unit 152 to the second-media support file system sub-unit 154.

As illustrated in FIG. 5, a file other than a stream file has a size smaller than or equal to the maximum file size (4 GB) defined by the file system employed by the second medium. Accordingly, a file is written to the second medium by using a file write instruction received from the application execution sub-unit 152.

Therefore, when reading a file, the file conversion processing sub-unit 153 directly outputs the file read instruction received from the application execution sub-unit 152 to the second-media support file system sub-unit 154 in step S208. In step S211, the second-media support file system sub-unit 154 reads a file from the second medium directly using the file read instruction output from the application execution sub-unit 152.

However, if, in step S204, the file conversion processing sub-unit 153 determines that the file type indicates a stream file, the processing proceeds to step S205. When the file type indicates a stream file, the file size may be larger than the maximum file size defined by the file system employed by the second medium (4 GB). Accordingly, as illustrated by the flowchart shown in FIG. 5, the file may be recorded onto the second medium in the form of separate files. In addition, the name of the file recorded on the second medium differs from the name of the file requested by the application execution sub-unit 152.

In step S205, the file conversion processing sub-unit 153 identifies a file that contains the data to be read and specified by the application execution sub-unit 152 using the arguments (the parameters) of the read instruction submitted by the application execution sub-unit 152 (i.e., the file name of the original file and the byte position from which the data is to be read in the original file). Furthermore, in step S206, the file conversion processing sub-unit 153 computes the file name of a second-medium file that contains the data to be read and specified by the application execution sub-unit 152 and the byte position from which the data is to be read in the file.

As described above with reference to the flowchart shown in FIG. 5, when recording a stream file onto the second medium, the file conversion processing sub-unit 153 converts the file name of the file (the original file) generated by the application execution sub-unit 152 into the name of a file to be recorded onto the second medium in accordance with a predetermined rule. In addition, if a file is separated when the file is recorded, the separating process is performed in accordance with a predetermined rule. Using the parameters of the read instruction submitted from the application execution sub-unit 152 (i.e., the file name of the original file and the byte position from which data is to be read) and the predetermined rule, the file conversion processing sub-unit 153 computes the file name of a file recorded on the second medium and the byte position from which the data is to be read in the file.

Subsequently, in step S207, the file conversion processing sub-unit 153 submits, to the second-media support file system sub-unit 154, a read instruction having parameters indicating the file name of the file to be read and the byte position from which data is to be read in the file.

In step S211, the second-media support file system sub-unit 154 reads the file from the second medium in accordance with the read instruction submitted from the file conversion processing sub-unit 153 in step S207.

Thereafter, the file conversion processing sub-unit 153 performs processing indicated by the flowchart shown in FIG. 7 on the file read from the second medium by the second-media support file system sub-unit 154. First, in step S301, the file conversion processing sub-unit 153 determines whether the readout file is a stream file. If the readout file is not a stream file, the processing proceeds to step S311, where the second-media support file system sub-unit 154 directly supplies, to the application execution sub-unit 152, the file read from the second medium by the second-media support file system sub-unit 154. Thereafter, the file readout process is completed.

However, if, in step S301, the readout file is a stream file, the processing proceeds to step S302, where the file conversion processing sub-unit 153 further determines whether the readout file is a separate file.

If the readout file is not a separate file, the processing proceeds to step S312, where the file conversion processing sub-unit 153 converts the file name of the file read from the second medium to the original file name and outputs the file to the application execution sub-unit 152. Thereafter, the file readout process is completed. Note that the file name conversion rule is predetermined. The file conversion processing sub-unit 153 converts the file name in accordance with the predetermined rule. However, as noted above, the file name conversion may be performed only when the file separation process is performed. In such a case, the processing performed in step S312 may be removed.

However, if, in step S302, the readout file is a separate file, the processing proceeds to step S303. In step S303, the separate files read from the second medium are concatenated, and an unseparated original file is generated. In addition, the original file name is assigned to the file. Thereafter, the file is output to the application execution sub-unit 152, and the processing is completed. Note that the file separation rule, the file concatenation rule, and the file name conversion rule are predetermined. The file conversion processing sub-unit 153 concatenates the separate files and assigns the file name to the concatenated file in accordance with the predetermined rules. In this way, the original file name is restored from the names of the separate file names and is output to the application execution sub-unit 152. By providing the file conversion processing sub-unit 153, the same module can be used as the application execution sub-unit 152 even when data is reproduced from the first medium 111 that has a less strict condition in terms of a file size and is reproduced from the second medium 112 that has a strict condition in terms of a file size. Accordingly, manufacturing of a reproduction apparatus can be advantageously facilitated.

As described above with reference to the flowcharts illustrated in FIGS. 5 to 7, the data recording sequence and the data reproduction sequence are performed. While the descriptions of the flowcharts illustrated in FIGS. 5 to 7 have been made with reference to the processes performed by the application execution sub-unit 152, the file conversion processing sub-unit 153, and the second-media support file system sub-unit 154, the same can apply to the processes performed by the encryption processing sub-unit 151, the file conversion processing sub-unit 153, and the second-media support file system sub-unit 154.

4. File Separation Process, File Concatenation Process, and File Name Conversion Rule As described above, when recording and reproducing a stream file onto and from a second medium, the file conversion processing sub-unit 153 performs one of the file separation process and the file concatenation process. The file conversion processing sub-unit 153 further performs the file name conversion process. These processes are performed in accordance with the predetermined rules.

The file separation process and the file concatenation process are described first with reference to FIG. 8. As described above, when the application execution sub-unit 152 or the encryption processing sub-unit 151 generates a file having a size larger than 4 GB and records the file onto a second medium 112, the file conversion processing sub-unit 153 separates the file. For the second medium 112, it is necessary to generate a file having file setting that complies with the specification of the second file system (FAT32) and, therefore, a file having a size larger than 4 GB is not acceptable. Note that, in FAT32, it is further necessary to set a file size to a multiple of 512 bytes. When these conditions are satisfied, the file conversion processing sub-unit 153 separates a stream file generated by the application execution sub-unit 152 or the encryption processing sub-unit 151 and having a size larger than 4 GB.

For example, the separation rule can include one of the following conditions (a) to (d) as shown in FIG. 8:

(a) The file separation point is set so as to be a multiple of a sector boundary (2048 bytes) set for a medium that employs the first file system (a Blu-ray disc™);

(b) The file separation point is set so as to be a multiple of an aligned unit (6144 bytes) subjected to an encryption process, which is a unit of the content recorded in a medium that employs the first file system (a Blu-ray disc™)

(c) The file separation point is set so as to be a multiple of 1 MB; and (d) The file is separated by 3 GB.

A file is separated using one of the rules (a) to (d). In addition, when files are concatenated, the files are concatenated using the separation points determined in accordance with one of the rules (a) to (d).

An example of the file name conversion rule is described next with reference to FIG. 9. As described above, when separating a file, the file conversion processing sub-unit 153 assigns, to each of a plurality of separate files, a file name including the identification information regarding the original file and the arrangement information regarding the separate file. For example, let [00001.mts] denote the name of an unseparated original file. Then, the file name conversion rule can include one of the following conditions (a) and (b) as illustrated in FIG. 9:

(a) A serial number xxx is used for the extension of the separate files (the serial number xxx may be decimal, hexadecimal, or base-36). Examples of the file name (in the case of a decimal xxx) include [00001.001], [00001.002], [00001.003] . . . or [00001.000], [00001.001], [00001.002], . . .

(b) The file extension continues to be "mts". A serial number xx is appended to the filename (the serial number xx may be decimal, hexadecimal, or base-36). Examples of the file name (in the case of a decimal xxx) include [00001_1.mts], [00001_02.mts], [00001_03.mts] . . . or [00001_00.mts], [00001_01.mts], [00001_02.mts], . . .

When the separation process is performed, a file name is assigned to each of the separate files using one of the above-described rules (a) and (b). Thereafter, the separate files are recorded onto the second medium. In contrast, when the concatenation process is performed, the original file name is restored for the concatenated file using an operation that is the reverse of the operation used when the separation process is performed.

While the file name conversion process performed when a file is separated has been described with reference to FIG. 9, a file that has not been separated may be recorded onto the second medium 112 without changing the name of the file. If the name of the file is converted, an extension (a number) that is not applied to a normal separate file (e.g., [00001.999] in the case (a)) is assigned to the file so that the second-media support file system sub-unit 154 can recognize that the file is not a separate file. Even in the case (b), for example, the file name [00001_99.mts] can be assigned to the file that is not a separate file.

5. Data Storing Structure of Second Medium and File Recognized by Application in File Conversion Process An exemplary data structure of data recorded on the second medium in accordance with the specification of the second file system and an example of a file recognized by the application execution sub-unit 152 through the file conversion process performed by the file conversion processing sub-unit 153 are described next with reference to the drawings subsequent to FIG. 10.

Figure 10:
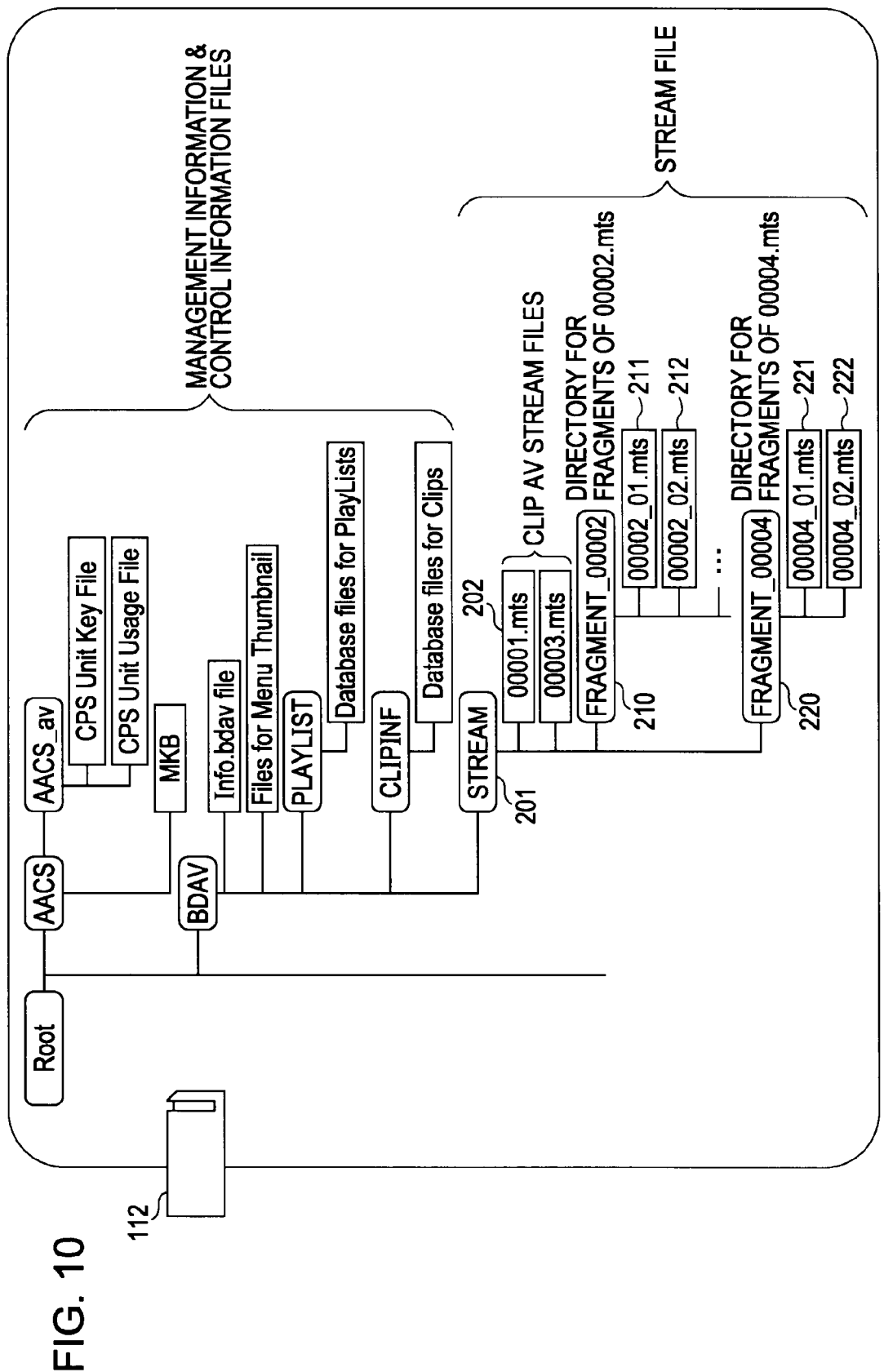
FIG. 10 illustrates an example of data structure of data recorded on the second medium.

FIG. 10 illustrates an example of the data storing structure of the second medium. This directory structure is similar to the data structure of data recorded on the first medium 111 (a Blu-ray Disc™) illustrated in FIG. 4.

Directories [AACS] and [BDAV] are generated immediately beneath the root directory [Root]. The [AACS] directory stores, for example, encryption key information in accordance with the specification of the above-described AACS. More specifically, a CPS unit key file that contains key information used for encryption and decryption of content to be recorded onto a medium and a media key block (MKB) file which is a key block used for acquiring a key from a CPS unit key are set in the [AACS] directory.

The [BDAV] directory is a directory in which actual data of recorded content and reproduction control information used for a reproduction process are set.

More specifically, the [BDAV] directory contains index information (info.bday.file) including the title of the content, a menu thumbnail (Files for Menu.Thumbnail) including still image content, a playlist (PLAYLIST) serving as reproduction control information regarding moving image content, clip information (CLIPINF), and a stream (STREAM) which is actual data of the content. For example, a file containing the actual data of the recorded content (a stream file) is recorded in the stream directory (STREAM).

The files [info.bday.file] to [CLIPINFO] in the AACS directory setting file and the BDAV directory setting file are similar to those illustrated in FIG. 4. The size of each of the files is smaller than or equal to 4 GB and, therefore, does not exceed the allowable maximum size of the second file system (FAT32). Accordingly, these files are set so as to have formats the same as the data stored in the first medium 111 as illustrated in FIG. 4.

A file set in the stream directory [STREAM] 201 located as the last sub-directory of the BDAV directory shown in FIG. 10 is the actual content data of, for example, audio visual (AV) content. Thus, the file may have a size larger than 4 GB when the file is generated by the application execution sub-unit 152. Accordingly, if the stream file has a size larger than 4 GB, the file is separated into a plurality of separate files by the file conversion processing sub-unit 153, and the plurality of separate files are recorded onto the second medium 112.

In the directory setting illustrated in FIG. 10, a sub-directory [FRAGMENT_xxxxx] is generated beneath the stream directory [STREAM] 201 for each of the unseparated original files. A plurality of separate files generated by separating the original file are stored beneath the sub-directory. In the example shown in FIG. 10, sub-directories 210 and 220 are set for the original files.

A plurality of separate files 211 [00002_01.mts], 212 [00002_02.mts], ... generated by separating the original file [00002.mts] are set in the sub-directory 210 [FRAGMENT_00002]. Similarly, a plurality of separate files 221 [00004_01.mts], 222 [00004_02.mts], ... generated by separating the original file [00004.mts] are set in the sub-directory 220 [FRAGMENT_00004].

Note that a stream file that is not located beneath a sub-directory [FRAGMENT_xxxxx] (e.g., the stream file [00001.mts] 202 or the stream file [00003.mts] shown in FIG. 10) has a size smaller than or equal to 4 GB and, therefore, the stream file is not separated.

Figure 11:
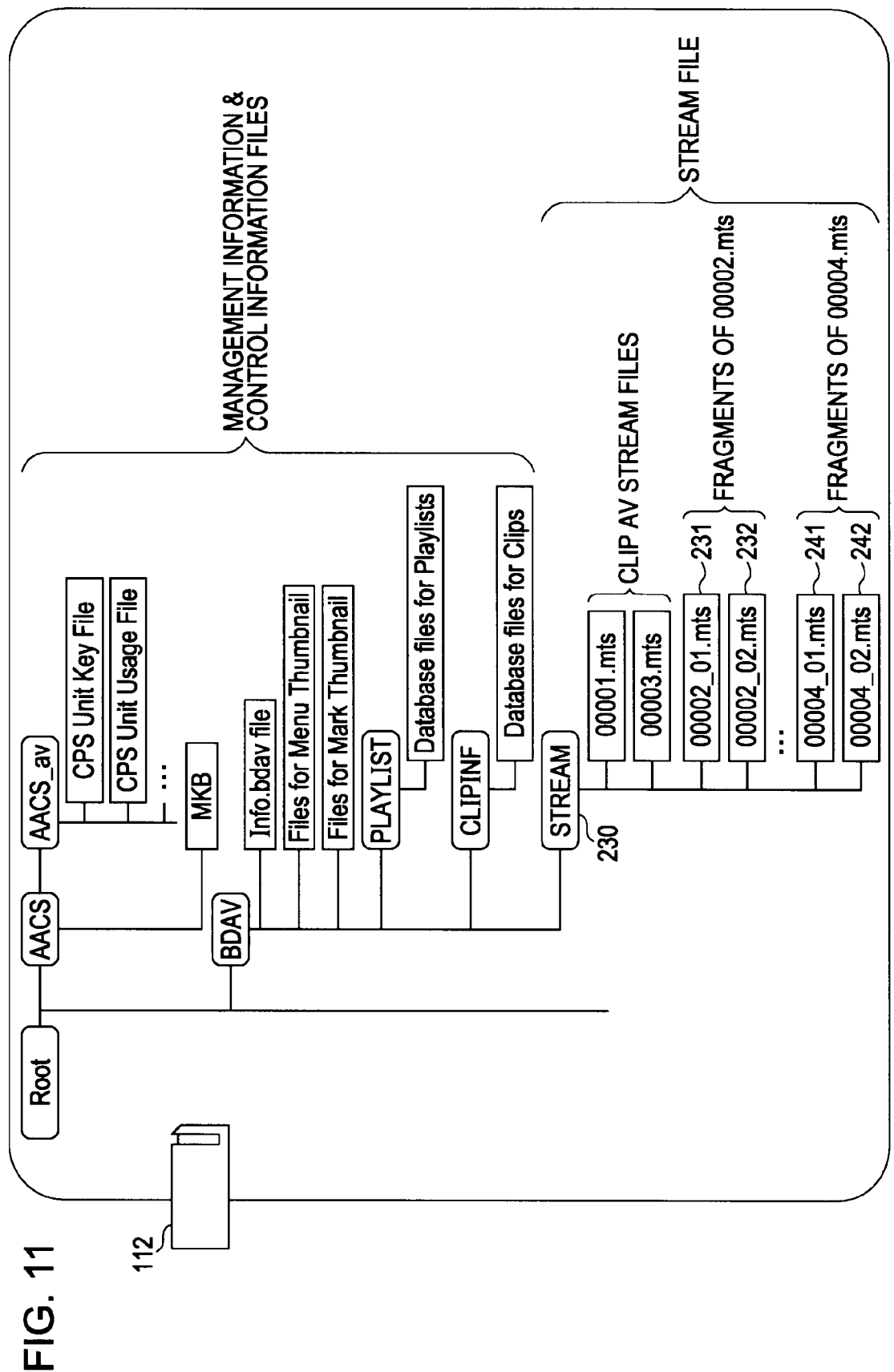
FIG. 11 illustrates another example of data structure of data recorded on the second medium.

FIG. 11 illustrates another example of a data storing structure of the second medium 112. The data storing structure is similar to that shown in FIG. 10 except for a stream directory [STREAM] 230.

Unlike the directory setting shown in FIG. 10, in the directory setting shown in FIG. 11, a sub-directory for each of the original files is not generated. Files that are generated by separating the original file and that are to be recorded are directly set in the stream directory [STREAM] 230.

That is, in the example shown in FIG. 11, separate files 231 [00002_01.mts] and 232[00002_02.mts] are generated by separating the original file [00002.mts]. In addition, separate files 241 [00004_01.mts] and 242 [00004_02.mts] are generated by separating the original file [00004.mts].

For example, a stream file separated by the file conversion processing sub-unit 153 is recorded onto the second medium 112 using one of the directory setting illustrated in FIGS. 10 and 11.

However, when such separate recorded files are read from the second medium 112 and are supplied to the application execution sub-unit 152 or the encryption processing sub-unit 151, the above-described processing illustrated using the flowcharts of FIGS. 6 and 7 is performed. Thus, the separate files are concatenated, and the file names are converted by the file conversion processing sub-unit 153.

As a result of the processing, the directory structure recognized by the application execution sub-unit 152 or the encryption processing sub-unit 151 differs from the directory structure that contains separate files as shown in FIGS. 10 and 11. More specifically, the directory structure is the one as shown in FIG. 12.

Figure 12:
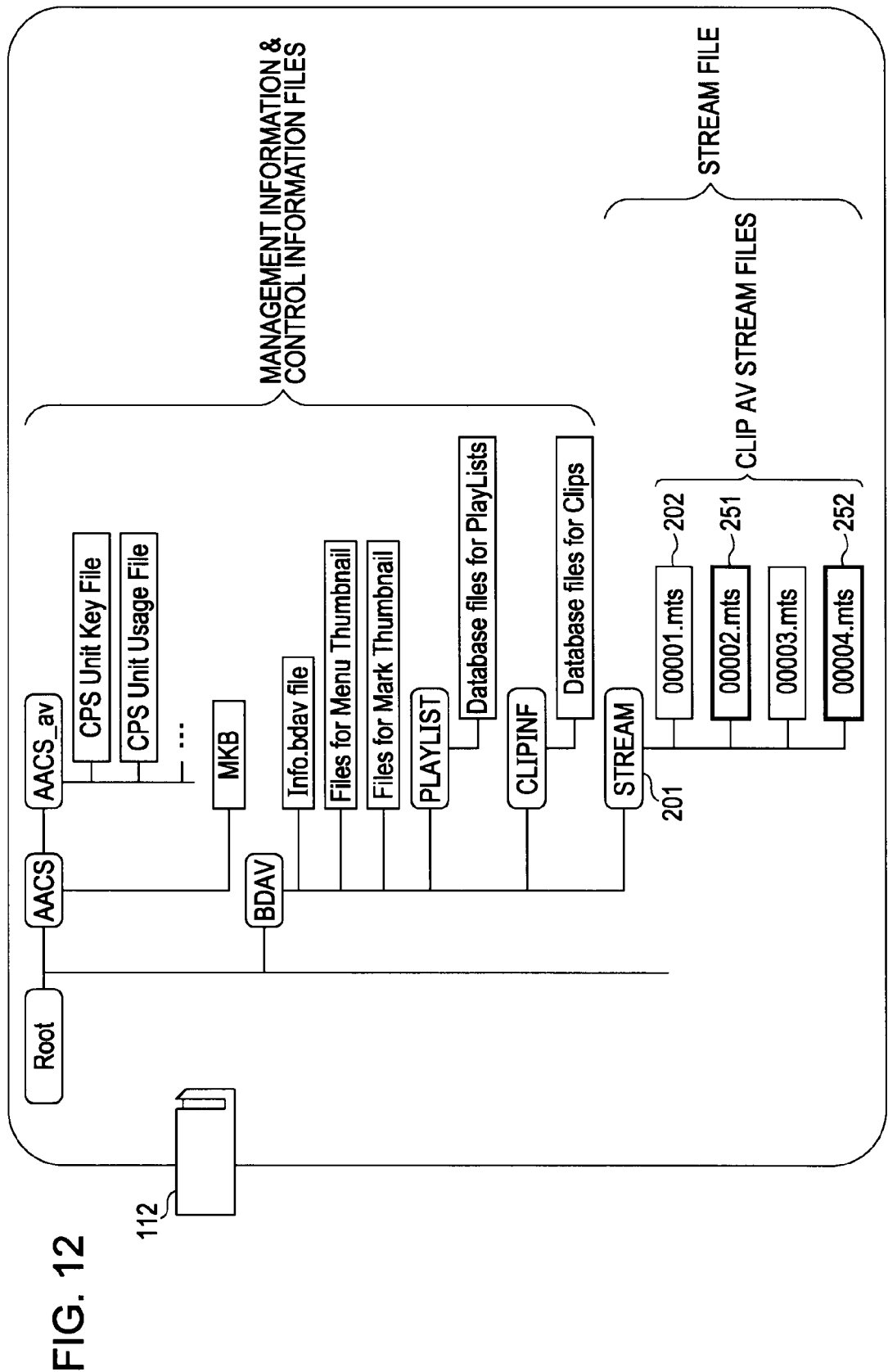
FIG. 12 illustrates the data structure of data recorded on the second medium and stream files viewed from a standpoint of applications.

As shown in FIG. 12, the application execution sub-unit 152 or the encryption processing sub-unit 151 recognizes an original file 251 [00002.mts] and 252[00004.mts] of the recorded separate files. As a result, the application execution sub-unit 152 or the encryption processing sub-unit 151 can recognize the files as files similar to the data recorded in the first medium 111 illustrated in FIG. 4. Consequently, the application execution sub-unit 152 or the encryption processing sub-unit 151 can perform the processing on the separate stream files recorded on the second medium 112 in the same manner as the processing performed on the data recorded on the first medium 111.

6. File Conversion Process Performed during File Editing

The processing performed by the file conversion processing sub-unit 153 when the file conversion processing sub-unit 153 reads separate files recorded on the second medium 112 and the application execution sub-unit 152 edits the file (e.g., data deletion or data insertion) is described next.

In some cases, the application execution sub-unit 152 reads a file recorded on the second medium 112 and edits the data in the file. Examples of data editing include data deletion or data insertion. The application performs such processing on an original file [xxxxx.mts]. However, in this case, the original file [xxxxx.mts] is a concatenated file of a plurality of separate files [xxxxx_01.mts] to [xxxxx_nn.mts] recorded on the second medium 112.

When the application execution sub-unit 152 performs an editing process, the edited separate files [xxxxx_01.mts] to [xxxxx_nn.mts] may not be directly recorded onto the second medium 112. For example, through data deletion, all data in a separate file may be removed. In addition, through data insertion, the size of a separate file may exceed 4 GB.

Accordingly, when the application execution sub-unit 152 performs an editing process, it may be necessary for the file conversion processing sub-unit 153 to remove a separate file, add a separate file, or update a separate file in accordance with the edited stream file. The processing performed by the file conversion processing sub-unit 153 when a data editing process is performed is described next with reference to FIG. 13. The processing performed by the file conversion processing sub-unit 153 is described with reference to the following examples:

(6-1) Exemplary Processing Performed during Data Deletion, and (6-2) Exemplary Processing Performed during Data Insertion.

(6-1) Exemplary Processing Performed during Data Deletion

The processing performed by the file conversion processing sub-unit 153 when separate files recorded on the second medium 112 are read and data is deleted from the file by the application execution sub-unit 152 is described first.

When data is deleted, one of the following cases occurs:

(Case 1) All data to be deleted is contained in a single separate file to be edited, (Case 2) Data to be deleted spans two neighboring separate files to be edited, and (Case 3) Data to be deleted spans three or more continuous separate files to be edited.

The file conversion processing sub-unit 153 reconstructs the separate files in accordance with the one of the above-described cases. The data deletion processes performed in the above-described cases are sequentially described below with reference to FIGS. 13 to 15.

Figure 13:
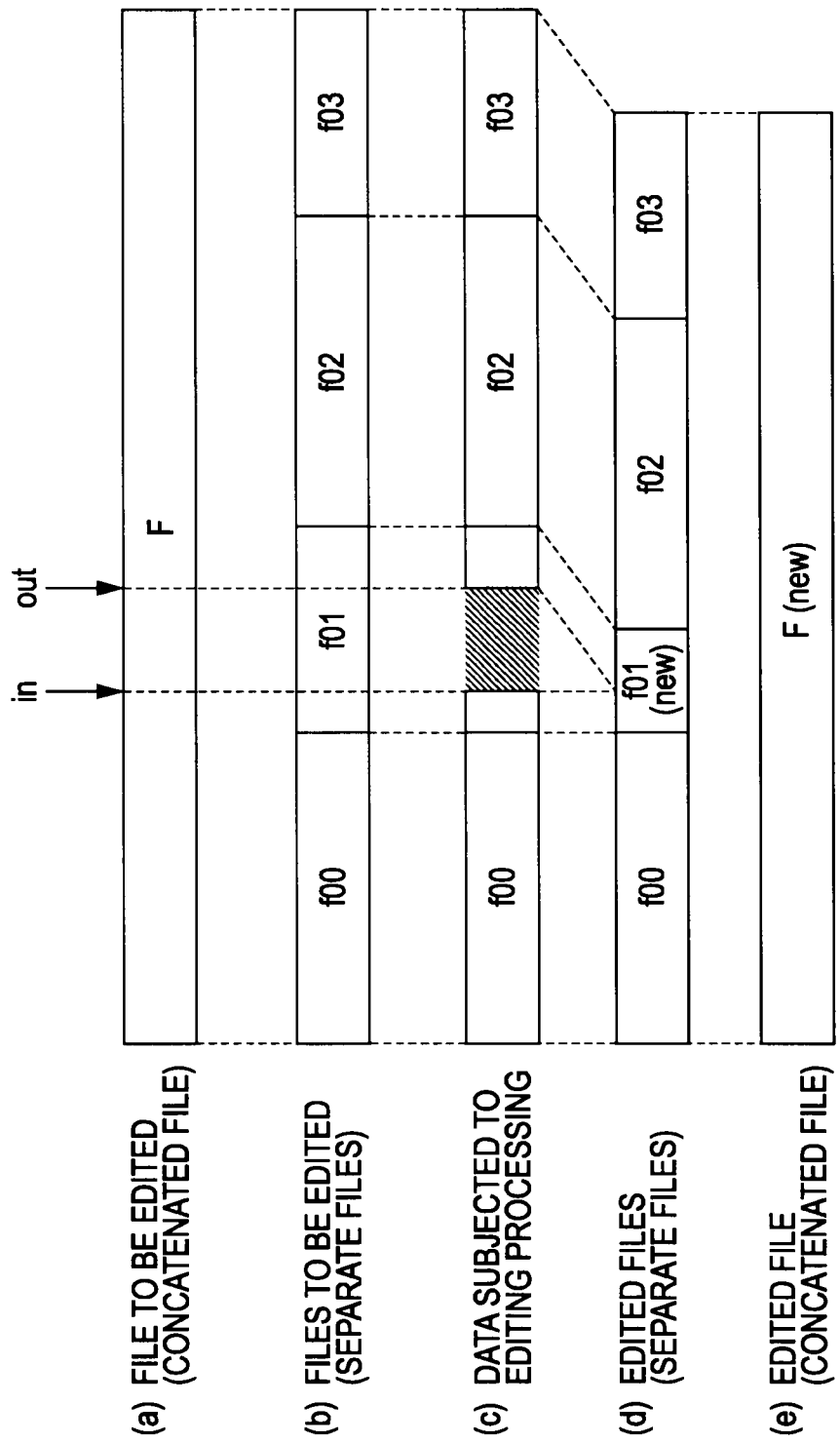
FIG. 13 illustrates an example of the file conversion process performed when data is deleted in a data editing process.

(Case 1) Case in which all Data to be Deleted is Contained in Single Separate File to be Edited The processing performed in the case in which all the data to be deleted is contained in a single separate file to be edited is described first with reference to FIG. 13. FIG. 13 illustrates the following data:

(a) A file to be edited (a concatenated original file to be edited by an application), (b) Files to be edited (separate files to be edited that are recorded in a second medium), (c) Data subjected to editing processing, (d) Edited file (edited separate files to be recorded onto the second medium), and (e) Edited file (an original file generated by concatenating the separate files edited by the application).

In FIG. 13, separate files [f00] to [f03] and a concatenated file [F] are shown. For example, in terms of the correspondence between each of the files and the file name set in accordance with the above-described example, the file name of the concatenated file [F] is [00001.mts], and the file names of the separate files [f0] to [f3] are [00001_00.mts] to [00001_03.mts], respectively.

In FIG. 13, these file names are not shown, and only the serial number portions of the separate files are shown.

Note that [(new)] is attached to the serial number portion of an update separate file (e.g., [f01 (new)]). Similarly, [(new)] is attached to the serial number portion of an update concatenated file (e.g., [F (new)]). Also, note that [f01 (new)] and [F (new)] indicate that these files are updated files of the separate file [f01] and the concatenated file [F], respectively. The file names of these files are not changed.

When stream file recorded on the second medium 112 is edited by the application execution sub-unit 152, a data read-out process that is similar to the data reproduction process indicated by the flowchart illustrated in FIG. 6 is performed first.

In the data readout process, the files to be edited (the separate files indicated by (b) in FIG. 13) are read out. Thereafter, the file conversion processing sub-unit 153 concatenates the readout files. Thus, the file to be edited (the concatenated file) and indicated by (a) in FIG. 13 is supplied to the application execution sub-unit 152.

Note that the file conversion processing sub-unit 153 maintains, in a memory, the names of the separate files that form the concatenated file supplied to the application execution sub-unit 152 and the data start and end positions of the separate files. Such data position information includes the concatenated data positions of the separate file (i.e., separation positions). The file conversion processing sub-unit 153 separates the file or concatenates the files using one of the rules illustrated in FIG. 8. It is predetermined which one of the rules is to be applied. The file conversion processing sub-unit 153 maintains, in a memory, the data start and end positions of the separate files including the concatenated data positions of a separate file (i.e., separation positions) generated by using one of the rules.

The application execution sub-unit 152 edits the file to be edited (indicated by (a) in FIG. 13) in accordance with, for example, a user instruction. In this example, data between the points "in" and "out" shown in FIG. 13 is deleted.

In the deletion process (Case 1) illustrated in FIG. 13, all the data to be deleted (data between the points "in" and "out") is contained in the separate file [f01].

The application execution sub-unit 152 edits the file to be edited (indicated by (a) in FIG. 13) in accordance with, for example, a user instruction. In this example, the data between the points "in" and "out" shown in FIG. 13 is deleted. That is, the editing processing indicated (c) in FIG. 13 is performed. Through the editing processing, the application execution sub-unit 152 generates the edited file (the concatenated file) [F (new)] indicated by (e) in FIG. 13.

After the editing processing is performed, the application execution sub-unit 152 submits a write instruction to write the edited file (the concatenated file) [F (new)] indicated by (e) in FIG. 13 onto the second medium 112. Upon detecting the write instruction received from the application execution sub-unit 152, the file conversion processing sub-unit 153 analyzes the edited data, that is, the edited file (the concatenated file) indicated by (e) in FIG. 13.

More specifically, the file conversion processing sub-unit 153 determines the correspondence between the data start and end positions including the concatenation data position (the separation position) of each of the separate files and the edited file (the concatenated file) indicated by (e) in FIG. 13 and identifies the position of data to be edited.

In this example, the data between the points "in" and "out" shown in FIG. 13 is deleted. The file conversion processing sub-unit 153 determines that the two data positions for deletion are contained in the separate file [f01].

On the basis of the determination, the file conversion processing sub-unit 153 separates the edited file (the concatenated file) received from the application execution sub-unit 152 and indicated by (e) in FIG. 13. Thus, the file conversion processing sub-unit 153 generates the edited file (the separate files) indicated by (d) in FIG. 13.

That is, in terms of the separate file [f01] including the deleted data (the data between the points "in" and "out"), the file conversion processing sub-unit 153 generates an updated file [f01 (new)] that does not include the deleted data. The data in the other separate files [f00], [f02], and [f03] remain unchanged. Accordingly, the file conversion processing sub-unit 153 does not update the separate files.

In this way, the separate files [f00], [f01 (new)], [f02], and [f03], some of which have been updated, are supplied from the file conversion processing sub-unit 153 to the second-media support file system sub-unit 154 and are recorded onto the second medium 112.

(Case 2) Case in which Data to be Deleted Spans Two Neighboring Separate Files to Be Edited The processing performed in the case in which the data to be deleted spans two neighboring separate files to be edited is described next with reference to FIG. 14. Like FIG. 13, FIG. 14 illustrates the following data:

(a) A file to be edited (a concatenated original file to be edited by an application), (b) Files to be edited (separate files to be edited that are recorded in a second medium), (c) Data subjected to editing processing, (d) Edited file (edited separate files to be recorded onto the second medium), and (e) Edited file (an original file generated by concatenating the separate files edited by the application).

Figure 14:
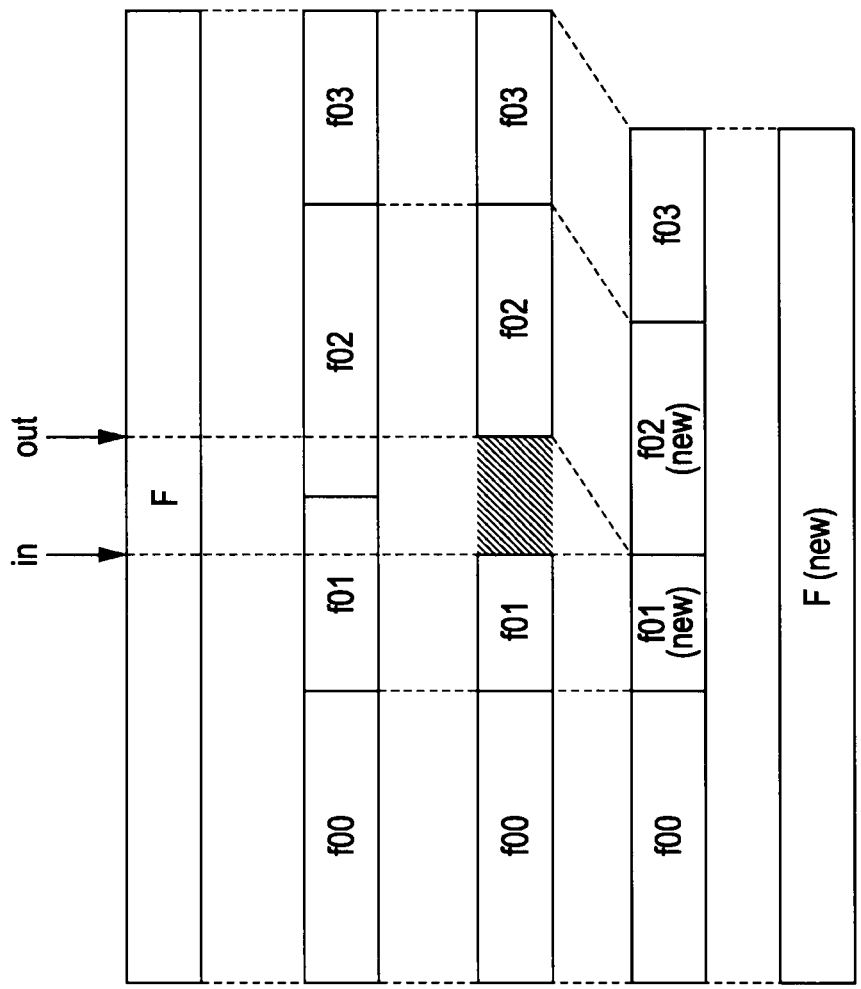
FIG. 14 illustrates another example of the file conversion process performed when data is deleted in a data editing process.

As in FIG. 13, separate files [f00] to [f03] and a concatenated file [F] are shown in FIG. 14. An updated file is indicated by "(new)" appended to the file name. That is, in place of the full file name, only the serial number portion is shown.

When the application execution sub-unit 152 edits a stream file recorded on the second medium 112, the files to be edited indicated by (b) in FIG. 14 (the separate files) are read first. Thereafter, the file conversion processing sub-unit 153 concatenates the files. Thus, the file to be edited indicated by (a) in FIG. 14 (the concatenated file) is supplied to the application execution sub-unit 152.

In addition, the file conversion processing sub-unit 153 maintains, in a memory, the names of the separate files that form the concatenated file supplied to the application execution sub-unit 152 and the data start and end positions of each of the separate files.

The application execution sub-unit 152 performs, for example, editing processing instructed by the user on the file to be edited indicated by (a) in FIG. 14 (the concatenated file). In this example, the data between the points "in" and "out" shown in FIG. 14 is deleted.

In the deletion process illustrated in FIG. 14 (Case 2), the data to be deleted (the data between the points "in" and "out") spans two neighboring files [f01] and [f02].

The application execution sub-unit 152 performs, for example, editing processing instructed by the user on the file to be edited indicated by (a) in FIG. 14 (the concatenated file). In this example, data between the points "in" and "out" shown in FIG. 14 is deleted. That is, the editing processing indicated by (c) shown in FIG. 14 is performed. Through the editing processing, the application execution sub-unit 152 generates the edited file (the concatenated file) [F (new)] indicated by (e) shown in FIG. 14.

After the editing processing is performed, the application execution sub-unit 152 submits a write instruction to write the edited file (the concatenated file) [F (new)] indicated by (e) shown in FIG. 14 onto the second medium 112. Upon detecting the write instruction submitted from the application execution sub-unit 152, the file conversion processing sub-unit 153 analyzes the edited data, that is, the edited file (the concatenated file) indicated by (e) shown in FIG. 14.

More specifically, the file conversion processing sub-unit 153 recognizes the correspondence between the data start and end positions of each of the separate files including the concatenation point of the file maintained in the memory and the edited file (the concatenated file) indicated by (e) shown in FIG. 14 and determines the position of the edited data.

In this example, the data between the points "in" and "out" shown in FIG. 14 is deleted. Thus, the file conversion processing sub-unit 153 determines that the data to be deleted spans the two separate files [f01] and [f02].

On the basis of the determination, the file conversion processing sub-unit 153 separates the edited file (the concatenated file) indicated by (e) shown in FIG. 14 and received from the application execution sub-unit 152 and generates the edited files (the separate files) indicated by (d) shown in FIG. 14.

That is, for the separate files [f01] and [f02] including the data to be deleted, the file conversion processing sub-unit 153 generates updated files [f01 (new)] and [f02 (new)] that do not contain the deleted data. The data in the other separate files [f00] and [f03] remain unchanged before and after the editing processing is performed. Accordingly, these separate files are not updated.

The separate files [f00], [f01 (new)], [f02 (new)], and [f03], some of which have been updated, are supplied from the file conversion processing sub-unit 153 to the second-media support file system sub-unit 154 and are recorded onto the second medium 112.

Figure 15:
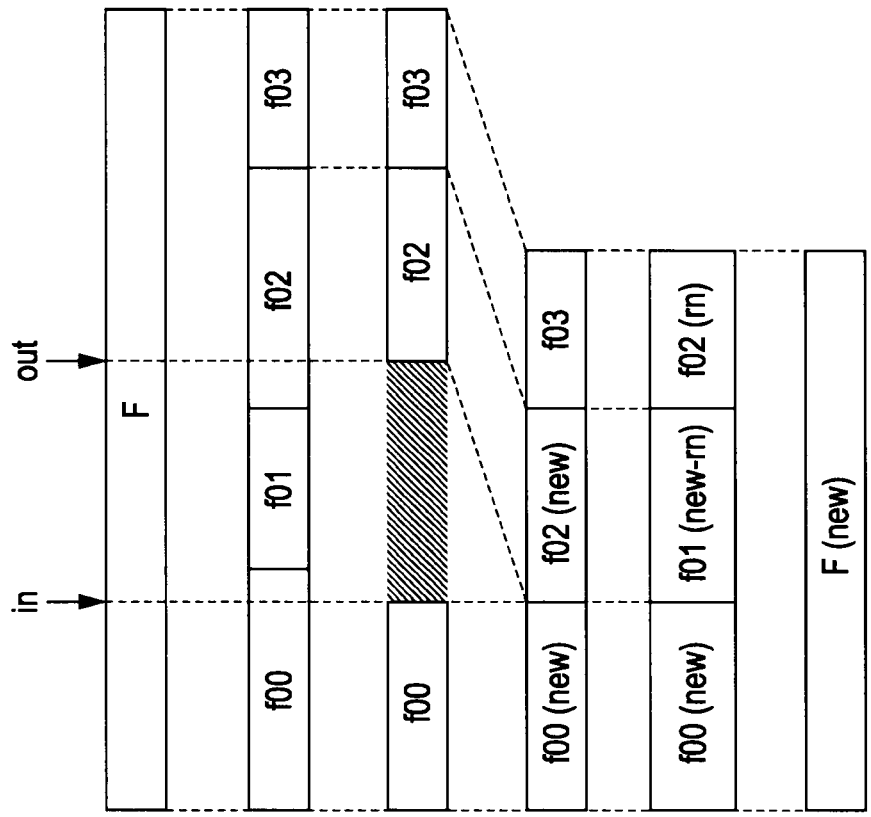
FIG. 15 illustrates still another example of the file conversion process performed when data is deleted in a data editing process.

(Case 3) Case in Which Data to Be Deleted Spans Three or More Continuous Separate Files to Be Edited The processing performed in the case in which the data to be deleted spans three or more continuous separate files to be edited is described next with reference to FIG. 15. FIG. 15 illustrates the following data:

(a) A file to be edited (a concatenated original file to be edited by an application), (b) Files to be edited (separate files to be edited that are recorded in a second medium), (c) Data subjected to editing processing, (d1) Edited file (edited separate files to be recorded onto the second medium before the file names are changed), (d2) Edited files (edited separate files to be recorded onto the second medium after the file names are changed), and (e) Edited file (an original file generated by concatenating the separate files edited by the application).

As in FIGS. 13 and 14, separate files [f00] to [f03] and a concatenated file [F] are shown in FIG. 15. In place of the file name, only the serial number portion is shown. An updated file is indicated by "(new)" appended to the serial number portion. "rn" indicates that the file name has been changed (renamed). "(new-rn)" indicates that the data in the file and the file name have been changed.

When the application execution sub-unit 152 edits a stream file recorded on the second medium 112, the files to be edited indicated by (b) in FIG. 15 (the separate files) are read first. Thereafter, the file conversion processing sub-unit 153 concatenates the files. Thus, the file to be edited indicated by (a) in FIG. 15 (the concatenated file) is supplied to the application execution sub-unit 152.

In addition, the file conversion processing sub-unit 153 maintains, in a memory, the names of the separate files that form the concatenated file supplied to the application execution sub-unit 152 and the data start and end positions of each of the separate files.

The application execution sub-unit 152 performs, for example, editing processing instructed by the user on the file to be edited indicated by (a) in FIG. 15 (the concatenated file). In this example, the data between the points "in" and "out" shown in FIG. 15 is deleted.

In the deletion process illustrated in FIG. 15 (Case 3), the data to be deleted (the data between the points "in" and "out") spans three neighboring separate files [f00] to [f02].

The application execution sub-unit 152 performs, for example, editing processing instructed by the user on the file to be edited indicated by (a) in FIG. 15 (the concatenated file). In this example, data between the points "in" and "out" shown in FIG. 15 is deleted. That is, the editing processing indicated by (c) shown in FIG. 15 is performed. Through the editing processing, the application execution sub-unit 152 generates the edited file (the concatenated file) [F (new)] indicated by (e) shown in FIG. 15.

After the editing processing is performed, the application execution sub-unit 152 submits a write instruction to write the edited file (the concatenated file) [F (new)] indicated by (e) shown in FIG. 15 onto the second medium 112. Upon detecting the write instruction submitted from the application execution sub-unit 152, the file conversion processing sub-unit 153 analyzes the edited data, that is, the edited file (the concatenated file) indicated by (e) shown in FIG. 15.

More specifically, the file conversion processing sub-unit 153 recognizes the correspondence between the data start and end positions of each of the separate files including the concatenation point of the file maintained in the memory and the edited file (the concatenated file) indicated by (e) shown in FIG. 15 and determines the position of the edited data.

In this example, the data between the points "in" and "out" shown in FIG. 15 is deleted. Thus, the file conversion processing sub-unit 153 determines that the data to be deleted spans the three separate files [f00], [f01] and [f02].

On the basis of the determination, the file conversion processing sub-unit 153 separates the edited file (the concatenated file) indicated by (e) shown in FIG. 15 and received from the application execution sub-unit 152 and generates the edited files (the separate files) indicated by (d1) shown in FIG. 15.

That is, from among the separate files [f00], [f01], and [f02] including the data to be deleted, the file conversion processing sub-unit 153 removes the separate file [f01] having all the data to be deleted. For the separate files [f00] and [f02] including the data that still remain, the file conversion processing sub-unit 153 generates updated files [f00 (new)] and [f02 (new)] that do not contain the deleted data. The data in the other separate file [f03] remain unchanged before and after the editing processing is performed. Accordingly, this separate file is not updated.

In the update process, the separate files [f00 (new)], [f02 (new)], and [f03] are generated. However, the file names of the separate files are not serial numbers.

For example, when the name of the original file (the concatenated file) is [00001.mts], the full file names of the separate files indicated by (d2) shown in FIG. 15 are represented as follows:

[f00 (new)]=[00001_00.mts],
[f02 (new)]=[00001_02.mts], and
[f03]=[00001_03.mts].
Accordingly, [00001_01.mts] is missing.

As described above with reference to FIG. 9, according to the file name setting rule for separate files, separate files generated by separating an original file have the file extensions that are serial numbers (refer to (a) in FIG. 9). Alternatively, the suffixes of the file names are serial numbers (refer to (b) in FIG. 9). In the example illustrated in FIG. 15, the suffixes of the file names are serial numbers (refer to (b) in FIG. 9).

However, as indicated by (d1) in FIG. 15, when, in a data deletion process, all the data in one of the separate files is deleted and if the file names of the separate files used before the editing processing is performed are directly used, the above-described rule is not satisfied. According to the serial number rule for the names of separate files, separate files generated by separating an original file have the file extensions or the file names that are serial numbers. That is, the serial number rule for the names of separate files is the rule described above with reference to FIG. 9.

If it is difficult to satisfy the serial number rule for the names of separate files, the file conversion processing sub-unit 153 changes the file names of the separate files. That is, the file names of the separate files are changed (renamed) so that the serial number rule for the names of separate files is satisfied. That is, as indicated by (d2) in FIG. 15, the names of the edited separate files are renamed so that the serial number rule for the names of separate files is satisfied. The files with "(rn)" indicated by (d) of FIG. 15 are renamed separate files.

For example, let [00001.mts] denote the file name of the original file (the concatenated file). Then, the full file names of the separate files are represented as follows:

[f00 (new)]->[f00 (new)]=[00001_01.mts] (not renamed),
[f02 (new)]->[f01 (new-rn)]=[00001_01.mts] (renamed), and
[f03 (new)]->[f02 (rn)]=[00001_02.mts].

As a result of renaming, the separate files corresponding to the updated concatenated file F [00001.mts] indicated by (e) in FIG. 15 have the following names:

[00001_00.mts],
[00001_01.mts], and
[00001_02.mts].

These three separate files are recorded onto the second medium 112.

In this way, by changing the file names so that the serial number rule for the names of separate files is satisfied and recording the files onto the second medium 112, the separate files can be reliably read from the second medium 112 in a readout process.

Figure 16:
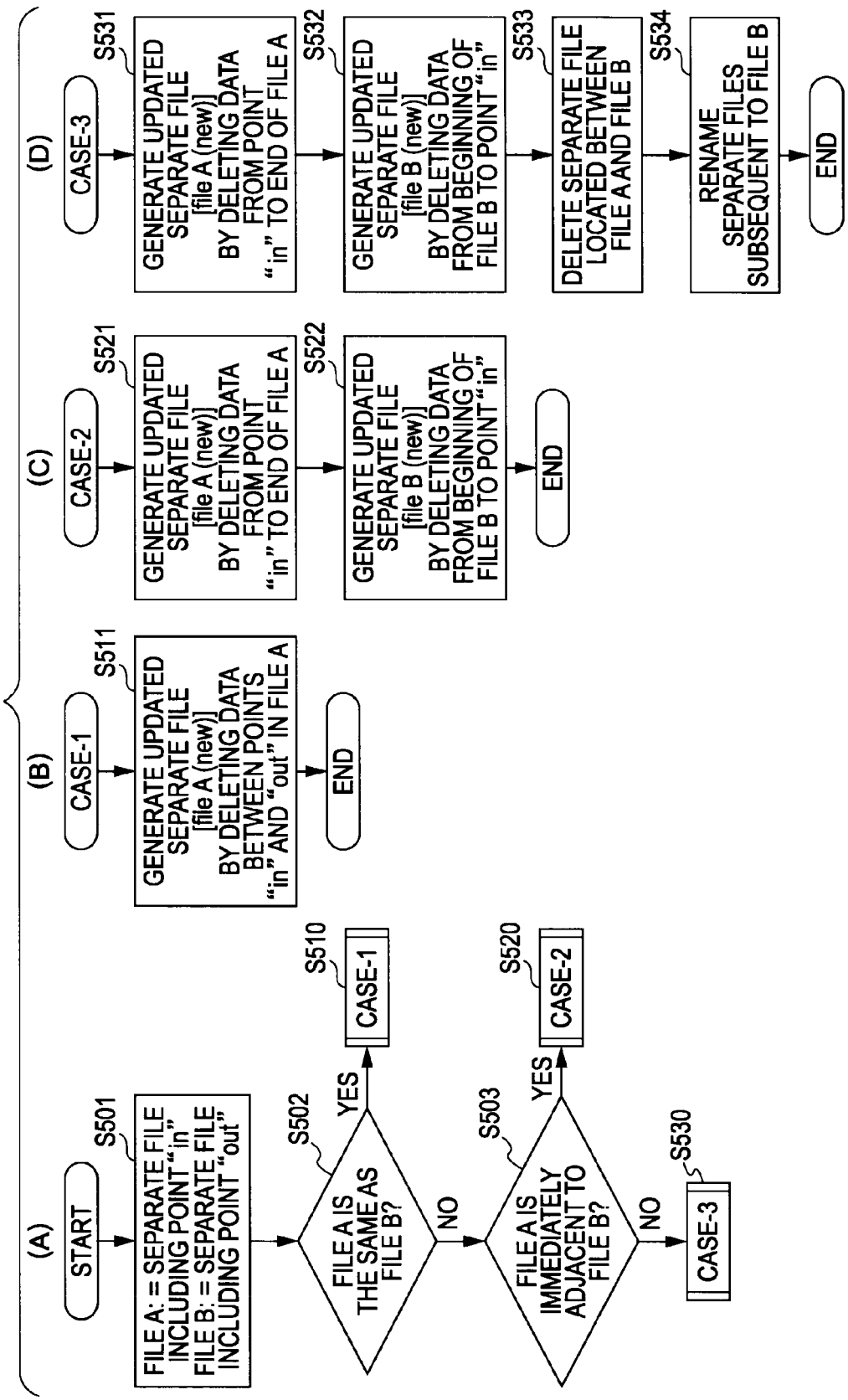
FIG. 16 illustrates yet still another example of the file conversion process performed when data is deleted in a data editing process.

As described above with reference to the flowcharts illustrated in FIGS. 13 to 15, the processing is performed by the file conversion processing sub-unit 153 when data editing including data deletion is performed by the application execution sub-unit 152 (Cases 1 to 3). FIG. 16 is a flowchart of the processing sequence performed by the file conversion processing sub-unit 153 when data editing including deletion of data in Cases 1 to 3 is performed.

The flowchart in FIG. 16 illustrates the following sequence of processes:

(A) whole sequence,
(B) sequence of processes in Case 1 (refer to FIG. 13),
(C) sequence of processes in Case 2 (refer to FIG. 14), and
(D) sequence of processes in Case 3 (refer to FIG. 15).

The whole sequence (A) is described first. The whole sequence (A) represents the sequence performed by the file conversion processing sub-unit 153 when the file conversion processing sub-unit 153 detects submission of an instruction to write data onto the second medium 112 after data editing including data deletion performed by the application execution sub-unit 152 is completed.

Upon detecting submission of an instruction to write the edited data onto the second medium 112, the file conversion processing sub-unit 153 receives the edited data from the application execution sub-unit 152. Thereafter, in step S501, the file conversion processing sub-unit 153 analyzes the edited data. At that time, the file conversion processing sub-unit 153 uses the data stored in the memory when the file conversion processing sub-unit 153 supplied the data to be edited to the application execution sub-unit 152, as described above with reference to FIGS. 13 to 15, that is, the file name of each of the separate files that form the concatenated file and the start and end positions of the data of each of the separate files.

In step S501, the file conversion processing sub-unit 153 identifies the separate file including the start position "in" and the end position "out" of the data to be deleted. Note that, at that time, the separate file to be edited is identified. In this case, suppose that files A and B are identified, where file A=a separate file including the start position "in" of the data to be deleted, and file B=a separate file including the end position "out" of the data to be deleted.

In step S502, the file conversion processing sub-unit 153 determines whether the files A and B identified in step S501 are the same. If the files A and B are the same, the processing proceeds to step S510, where the sequence of processes (B) in Case 1 is performed. This sequence of processes corresponds to the process illustrated in FIG. 13.

However, if, in step S502, the files A and B are not the same, the processing proceeds to step S503, where it is determined whether the file A is immediately adjacent to the file B. If the file A is immediately adjacent to the file B, the processing proceeds to step S520, where the sequence of processes (C) in Case 2 is performed. This sequence of processes corresponds to the process illustrated in FIG. 14.

However, if, in step S503, the file A is not immediately adjacent to the file B, the processing proceeds to step S530, where the sequence of processes (D) in Case 3 is performed. This sequence of processes corresponds to the process illustrated in FIG. 15.

The sequence of processes (B) in Case 1 illustrated in FIG. 16 is described. In Case 1, the file A is the same as the file B, where the file A=a separate file including the start position "in" of the data to be deleted, and the file B=a separate file including the end position "out" of the data to be deleted. That is, in Case 1, all the data to be deleted is contained in a single separate file, as illustrated in FIG. 13.

In such a case, in step S511, the file conversion processing sub-unit 153 generates an updated separate file [file A (new)] by deleting the data between the points "in" and "out" in the file A (=the file B). The file conversion processing sub-unit 153 does not update the separate files other than the update separate file [file A (new)]. This process corresponds to the process for generating an edited file (edited separate files) indicated by (d) in FIG. 13.

The separate files generated through the processing performed in step S511 are supplied to the second-media support file system sub-unit 154 and are recorded onto the second medium 112.

The sequence of processes (C) in Case 2 illustrated in FIG. 16 is described. In Case 2, the file A is immediately adjacent to the file B, where the file A=a separate file including the start position "in" of the data to be deleted, and the file B=a separate file including the end position "out" of the data to be deleted. That is, in Case 2, the data to be deleted spans two neighboring separate file, as illustrated in FIG. 14.

In such a case, in step S521, the file conversion processing sub-unit 153 generates an updated separate file [file A (new)] by deleting the data between the point "in" and the end point of the file A from the file A.

In addition, in step S522, the file conversion processing sub-unit 153 generates an updated separate file [file B (new)] by deleting the data between the beginning of the file B and the point "out" (the deletion end point) from the file B. The file conversion processing sub-unit 153 does not update the separate files other than the update separate files [file A (new)]

and [file B (new)]. The processing performed in steps S521 and S522 corresponds to the process for generating an edited file (an edited separate file) indicated by (d) in FIG. 14.

The separate files generated through the processing performed in steps S521 and S522 are supplied to the second-media support file system sub-unit 154 and are recorded onto the second medium 112.

The sequence of processes (D) in Case 3 illustrated in FIG. 16 is described. In Case 3, the data to be deleted spans three or more continuous separate files. That is, when the file A=a separate file including the start position "in" of the data to be deleted and the file B=a separate file including the end position "out" of the data to be deleted, at least one separate file C is present between the separate files A and B. This sequence of processes corresponds to the process illustrated in FIG. 15.

In such a case, in step S531, the file conversion processing sub-unit 153 generates an updated separate file [file A (new)] by deleting the data between the point "in" and the end point of the file A from the file A.

In addition, in step S532, the file conversion processing sub-unit 153 generates an updated separate file [file B (new)] by deleting the data between the start point of the file B and the point "out" (the deletion end point) from the file B.

Furthermore, in step S533, the file conversion processing sub-unit 153 deletes separate files located between the files A and B. The processing performed in steps S531 to S533 corresponds to the process for generating an edited file (edited separate files) indicated by (d1) in FIG. 15.

Subsequently, in step S534, the file conversion processing sub-unit 153 changes (renames) the names of the files so that the separate files subsequent to the file B which includes the point "out" (the deletion end point) have the file names that are serial numbers. The processing performed in step S534 corresponds to the process for generating an edited file (edited separate files) indicated by (d2) in FIG. 15.

The separate files generated through the processing performed in steps S531 to 5534 are supplied to the second-media support file system sub-unit 154 and are recorded onto the second medium 112.

(6-2) Exemplary Processing Performed during Data Insertion

The processing performed by the file conversion processing sub-unit 153 when separate files recorded on the second medium 112 are read and data is inserted into the file by the application execution sub-unit 152 is described next.

When data is inserted, one of the following cases occurs:

(Case 1) The file size of a separate file after data is inserted is within the maximum size defined by the file system, (Case 2) The file size of a separate file after data is inserted exceeds the maximum file size defined by the file system and, therefore, it is necessary to separate the file into two separate files, and (Case 3) The file size of a separate file after data is inserted exceeds the maximum size defined by the file system and, therefore, it is necessary to separate the file into three or more separate files.

The file conversion processing sub-unit 153 reconstructs the separate files in accordance with the one of the above-described cases. The data insertion processes performed in the above-described cases are described below with reference to FIGS. 17 to 19.

(Case 1) Case in which File Size of Separate File after Data is Inserted is within Maximum Size Defined by File System The case in which the file size of a separate file after data is inserted is within the maximum size defined by the file system is described with reference to FIG. 17 first.

In the present embodiment, the second medium 112 is used for data recording and reproduction that complies with the specifications of the second file system (FAT32). The maximum file size defined by the second file system is 4 GB.

Figure 17:
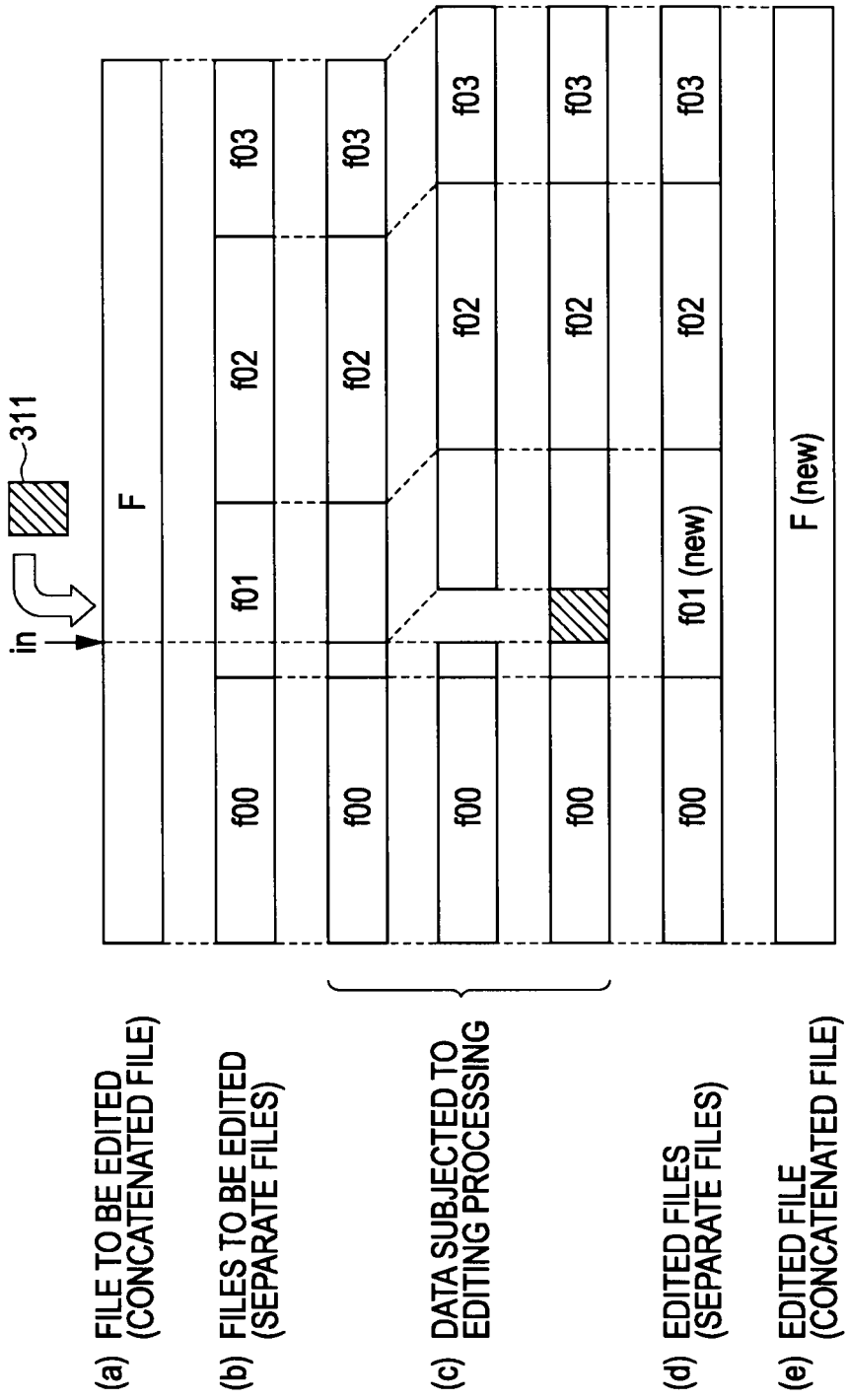
FIG. 17 illustrates an example of the file conversion process performed when data is inserted in a data editing process.

FIG. 17 illustrates the following data:
(a) A file to be edited (a concatenated original file to be edited by an application),
(b) Files to be edited (separate files to be edited that are recorded in a second medium),
(c) Data subjected to editing processing,
(d) Edited file (edited separate files to be recorded onto the second medium), and
(e) Edited file (an original file generated by concatenating the separate files edited by the application).

In FIG. 17, separate files [f00] to [f03] and a concatenated file [F] are shown. For example, in terms of the correspondence between each of the files and the file name set in accordance with the above-described example, the file name of the concatenated file [F] is [00001.mts], and the file names of the separate files [f0] to [f3] are [00001_00.mts] to [00001_03.mts], respectively.

In FIG. 17, these file names are not shown, and only the serial number portions of the separate files are shown.

Note that [(new)] is attached to the serial number portion of an update separate file (e.g., [f01 (new)]). Similarly, [(new)] is attached to the serial number portion of an update concatenated file (e.g., [F (new)]). Also, note that [f01 (new)] and [F (new)] indicate that these files are updated files of the separate file [f01] and the concatenated file [F], respectively. The file names of these files are not changed.

When stream file recorded on the second medium 112 is edited by the application execution sub-unit 152, a data readout process that is similar to the data reproduction process indicated by the flowchart illustrated in FIG. 6 is performed first.

In the data readout process, the files to be edited (the separate file indicated by (b) in FIG. 17) are read out. Thereafter, the file conversion processing sub-unit 153 concatenates the readout files. Thus, the file to be edited (the concatenated file) and indicated by (a) in FIG. 17 is supplied to the application execution sub-unit 152.

Note that the file conversion processing sub-unit 153 maintains, in a memory, the names of the separate files that form the concatenated file supplied to the application execution sub-unit 152 and the data start and end positions of the separate files. Such data position information includes the concatenated data positions of the separate file (i.e., separation positions). The file conversion processing sub-unit 153 separates the file or concatenates the files using one of the rules illustrated in FIG. 8. It is predetermined which one of the rules is to be applied. The file conversion processing sub-unit 153 maintains, in a memory, the data start and end positions of the separate files including the concatenated data positions of the separate file (i.e., separation positions) generated by using one of the rules.

The application execution sub-unit 152 edits the file to be edited (indicated by (a) in FIG. 17) in accordance with, for example, a user instruction. In this example, data (insertion data 311 shown in FIG. 17) is inserted at the point "in" shown in FIG. 17.

In the data insertion process (Case 1) illustrated in FIG. 17, the file size of a separate file after the data is inserted is within the maximum file size defined by the file system (4 GB for FAT32).

The application execution sub-unit 152 edits the file to be edited (indicated by (a) in FIG. 17) in accordance with, for example, a user instruction. In this example, the insertion data 311 is inserted at the point "in" shown in FIG. 17. That is, the editing processing indicated (c) in FIG. 17 is performed. That is, the file is separated at the point "in", the insertion data 311 is inserted, and the separate files are re-concatenated. Through the editing processing, the application execution sub-unit 152 generates the edited file (the concatenated file) [F (new)] indicated by (e) in FIG. 17.

After the editing processing is performed, the application execution sub-unit 152 submits a write instruction to write the edited file (the concatenated file) [F (new)] indicated by (e) in FIG. 17 to the second medium 112. Upon detecting the write instruction received from the application execution sub-unit 152, the file conversion processing sub-unit 153 analyzes the edited data, that is, the edited file (the concatenated file) indicated by (e) in FIG. 17.

More specifically, the file conversion processing sub-unit 153 determines the correspondence between the data start and end positions including the concatenation data position (the separation position) of each of the separate files and the edited file (the concatenated file) indicated by (e) in FIG. 17 and identifies the position of data to be edited.

In this example, the insertion data 311 is inserted at the points "in" shown in FIG. 17. The file conversion processing sub-unit 153 determines that the data insertion point is located in the separate file [f01]. The file conversion processing sub-unit 153 further determines whether the file size of the separate file [f01] after the data is inserted is within the maximum file size defined by the file system (4 GB for FAT32). In Case 1 shown in FIG. 17, the file size of the separate file [f01] after the data is inserted is within the maximum file size defined by the file system (4 GB for FAT32).

On the basis of the determination, the file conversion processing sub-unit 153 separates the edited file (the concatenated file) received from the application execution sub-unit 152 and indicated by (e) in FIG. 17. Thus, the file conversion processing sub-unit 153 generates the edited file (the separate files) indicated by (d) in FIG. 17.

That is, in terms of the separate file [f01] into which the data is inserted, the file conversion processing sub-unit 153 generates an updated file [f01 (new)] that includes the inserted data. The data in the other separate files [f00], [f02], and [f03] remain unchanged before and after the editing processing is performed. Accordingly, the file conversion processing sub-unit 153 does not update the separate files.

In this way, the separate files [f00], [f01 (new)], [f02], and [f03], some of which have been updated, are supplied from the file conversion processing sub-unit 153 to the second-media support file system sub-unit 154 and are recorded onto the second medium 112.

Figure 18:
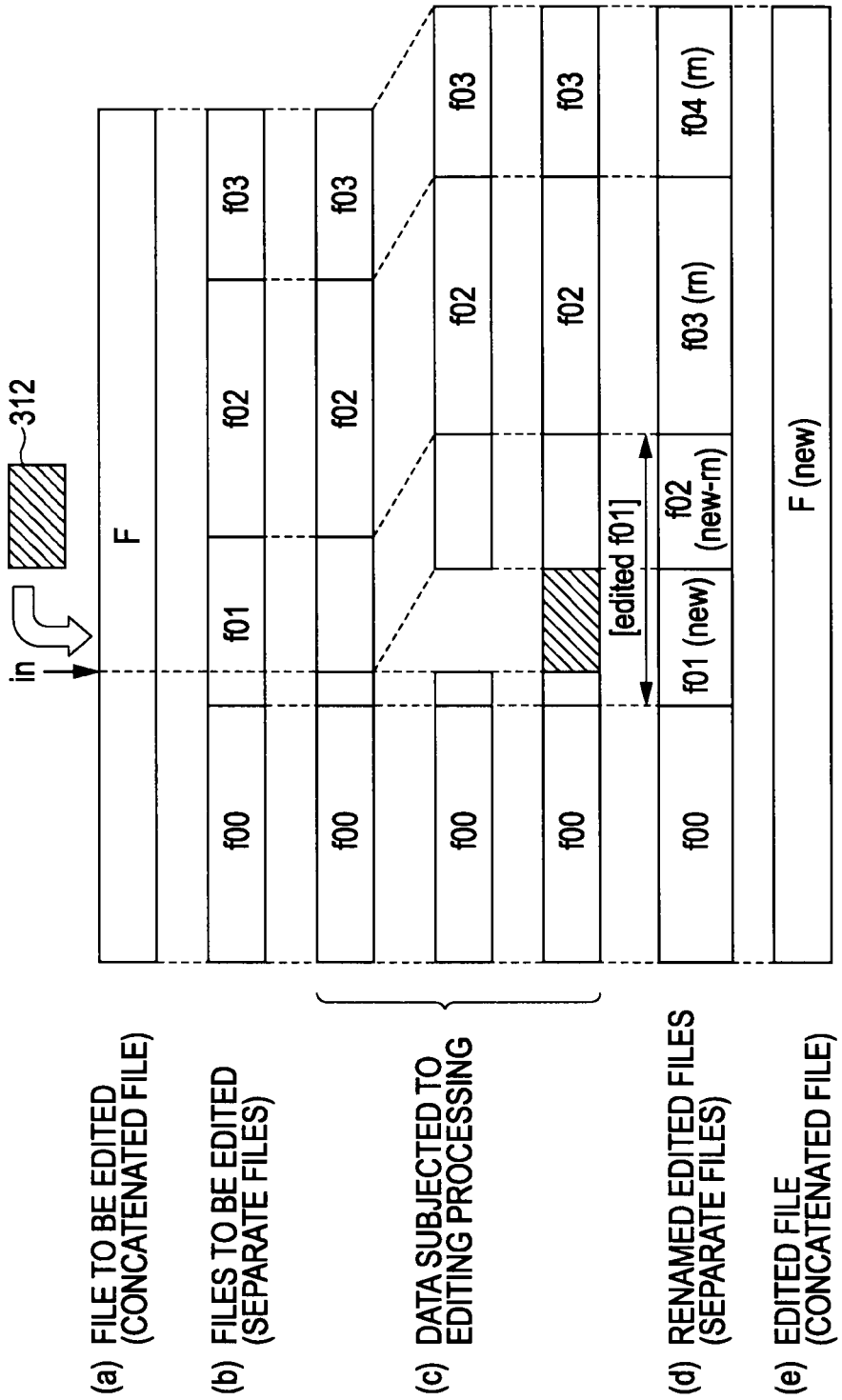
FIG. 18 illustrates another example of the file conversion process performed when data is inserted in a data editing process.

(Case 2) Case in which File Size of Separate File after Data is Inserted Exceeds Maximum Size Defined by File System and it is Necessary to Split File into Two Separate Files The case in which the file size of the separate File after data is inserted exceeds the maximum size defined by the file system and it is necessary to split the file into two separate files is described next with reference to FIG. 18. Like FIG. 17, FIG. 18 illustrates the following data:
(a) A file to be edited (a concatenated original file to be edited by an application),
(b) Files to be edited (separate files to be edited that are recorded in a second medium),
(c) Data subjected to editing processing,
(d) Edited file (edited separate files to be recorded onto the second medium), and
(e) Edited file (an original file generated by concatenating the separate files edited by the application).

As in FIG. 17, separate files [f00] to [f03] and a concatenated file [F] are shown in FIG. 18. An updated file is indicated by "(new)" appended to the name of the file. That is, in place of the file name, only the serial number portion is shown. "rn" indicates that the file name has been changed (renamed). "(new-rn)" indicates that the data in the file and the file name have been changed.

When the application execution sub-unit 152 edits a stream file recorded on the second medium 112, the files to be edited indicated by (b) in FIG. 18 (the separate files) are read first. Thereafter, the file conversion processing sub-unit 153 concatenates the files. Thus, the file to be edited indicated by (a) in FIG. 18 (the concatenated file) is supplied to the application execution sub-unit 152.

In addition, the file conversion processing sub-unit 153 maintains, in a memory, the names of the separate files that form the concatenated file supplied to the application execution sub-unit 152 and the data start and end positions of each of the separate files.

The application execution sub-unit 152 performs, for example, editing processing instructed by the user on the file to be edited indicated by (a) in FIG. 18 (the concatenated file). In this example, insertion data 312 is inserted at the point "in" shown in FIG. 18. That is, the editing processing indicated by (c) in FIG. 18 is performed. The file is separated at the point "in", and the insertion data 312 is inserted. Thereafter, the files are re-concatenated. Through the editing processing, the application execution sub-unit 152 generates the edited file (the concatenated file) [F (new)] indicated by (e) shown in FIG. 18.

After the editing processing is performed, the application execution sub-unit 152 submits a write instruction to write the edited file (the concatenated file) [F (new)] indicated by (e) shown in FIG. 18 onto the second medium 112. Upon detecting the write instruction submitted from the application execution sub-unit 152, the file conversion processing sub-unit 153 analyzes the edited data, that is, the edited file (the concatenated file) indicated by (e) shown in FIG. 18.

More specifically, the file conversion processing sub-unit 153 recognizes the correspondence between the data start and end positions of each of the separate files including the concatenation point of the file maintained in the memory and the edited file (the concatenated file) indicated by (e) shown in FIG. 18 and determines the position of the edited data.

In this example, the insertion data 311 is inserted at the point "in" shown in FIG. 18. Thus, the file conversion processing sub-unit 153 determines that the data insertion point is located in the separate file [f01]. In addition, the file conversion processing sub-unit 153 determines whether the file size of the separate file [f01] after the data is inserted is within the maximum file size defined by the file system (4 GB for FAT32). In Case 1 illustrated in FIG. 18, the file size of the separate file after the data is inserted exceeds the maximum file size defined by the file system (4 GB for FAT32) and, therefore, it is necessary to split the file into two separate files.

On the basis of the determination, the file conversion processing sub-unit 153 separates the edited file (the concatenated file) received from the application execution sub-unit 152 and indicated by (e) in FIG. 18. Thereafter, the file conversion processing sub-unit 153 generates the edited files (the separate files) having renamed file name, as indicated by (d) in FIG. 18.

That is, in terms of the separate file [f01] into which the data is inserted, the file conversion processing sub-unit 153 generates an updated file [edited f01] that includes the inserted data. In addition, the file conversion processing sub-unit 153 further separates the file [edited f01] so that each of the separate files has a file size smaller than or equal to the maximum file size defined by the file system (4 GB for FAT32). As indicated by (d) in FIG. 18, separate files [f01 (new)] and [f02 (new-rn)] are generated through the additional separation process. Note that when the separation process is performed, the rule applied to the first data recording process is also applied to the separation process. That is, one of the rules illustrated in FIG. 8 is applied to the separation process.

Furthermore, when the additional separation process is performed, the file names of the separate files are changed. That is, since the number of edited separate files is larger than the number of separate files to be edited, the serial number rule for the names of separate files is not satisfied unless new file names are set. According to the serial number rule for the names of separate files, separate files generated by separating an original file have file extensions or file names that are serial numbers. That is, the serial number rule for the names of separate files is the rule described above with reference to FIG. 9.

If it is difficult to satisfy the serial number rule for the names of separate files, the file conversion processing sub-unit 153 changes the file names of the separate files. That is, the file names of the separate files are changed (renamed) so that the serial number rule for the names of separate files is satisfied. That is, as indicated by (d) in FIG. 18, the names of the edited separate files are renamed so that the serial number rule for the names of separate files is satisfied. The file with "(rn)" indicated by (d) of FIG. 18 are renamed separate file. All of the separate files subsequent to the new separate file [f02 (new-rn)] are renamed.

In this way, the separate files [f00], [f01 (new)], [f02 (new-rn)], [f03 (rn)], and [f04 (rn)], some of which have been updated, are supplied from the file conversion processing sub-unit 153 to the second-media support file system sub-unit 154 and are recorded onto the second medium 112.

As described above, by changing the file names so that the serial number rule for the names of separate files is satisfied and recording the files onto the second medium 112, the separate files can be reliably read from the second medium 112 in a readout process.

(Case 3) Case in which File Size of Separate File after Data is Inserted Exceeds Maximum Size Defined by File System and it is Necessary to Separate File into Three or More Separate Files The case in which the file size of the separate File after data is inserted exceeds the maximum size defined by the file system and it is necessary to separate the file into three or more separate files is described next with reference to FIG. 19. Like FIGS. 17 and 18, FIG. 19 illustrates the following data:

(a) A file to be edited (a concatenated original file to be edited by an application), (b) Files to be edited (separate files to be edited that are recorded in a second medium), (c) Data subjected to editing processing, (d) Edited file (edited separate files to be recorded onto the second medium), and (e) Edited file (an original file generated by concatenating the separate files edited by the application).

Figure 19:
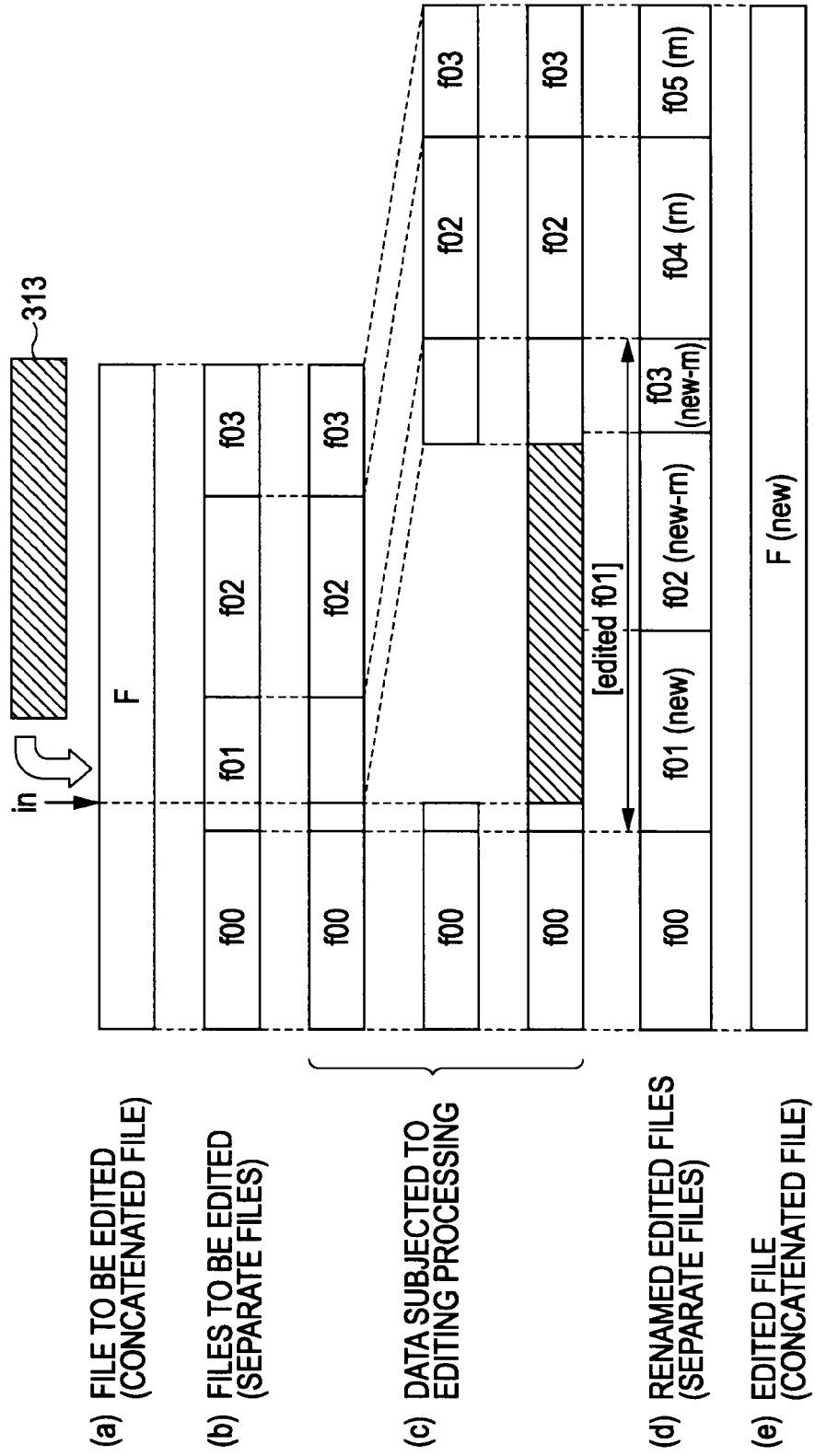
FIG. 19 illustrates still another example of the file conversion process performed when data is inserted in a data editing process.

As in FIG. 18, separate files [f00] to [f03] and a concatenated file [F] are shown in FIG. 19. An updated file is indicated by "(new)" appended to the reference numeral of the file. That is, in place of the file name, only the serial number portion is shown. "rn" indicates that the file name has been changed (renamed). "(new-rn)" indicates that the data in the file and the file name have been changed.

When the application execution sub-unit 152 edits a stream file recorded on the second medium 112, the files to be edited indicated by (b) in FIG. 19 (the separate files) are read first. Thereafter, the file conversion processing sub-unit 153 concatenates the files. Thus, the file to be edited indicated by (a) in FIG. 19 (the concatenated file) is supplied to the application execution sub-unit 152.

In addition, the file conversion processing sub-unit 153 maintains, in a memory, the names of the separate files that form the concatenated file supplied to the application execution sub-unit 152 and the data start and end positions of each of the separate files.

The application execution sub-unit 152 performs, for example, editing processing instructed by the user on the file to be edited indicated by (a) in FIG. 19 (the concatenated file). In this example, insertion data 313 is inserted at the point "in" shown in FIG. 19. That is, the editing processing indicated by (c) in FIG. 19 is performed. The file is separated at the point "in", and the insertion data 313 is inserted. Thereafter, the files are re-concatenated. Through the editing processing, the application execution sub-unit 152 generates the edited file (the concatenated file) [F (new)] indicated by (e) shown in FIG. 19.

After the editing processing is performed, the application execution sub-unit 152 submits a write instruction to write the edited file (the concatenated file) [F (new)] indicated by (e) shown in FIG. 19 onto the second medium 112. Upon detecting the write instruction submitted from the application execution sub-unit 152, the file conversion processing sub-unit 153 analyzes the edited data, that is, the edited file (the concatenated file) indicated by (e) shown in FIG. 19.

More specifically, the file conversion processing sub-unit 153 recognizes the correspondence between the data start and end positions of each of the separate files including the concatenation point (the separation point) of the file maintained in the memory and the edited file (the concatenated file) indicated by (e) shown in FIG. 19 and determines the position of the edited data.

In this example, the insertion data 313 is inserted at the point "in" shown in FIG. 19. Thus, the file conversion processing sub-unit 153 determines that the data insertion point is located in the separate file [f01]. In addition, the file conversion processing sub-unit 153 determines whether the file size of the separate file [f01] after the data is inserted is within the maximum file size defined by the file system (4 GB for FAT32). In Case 1 illustrated in FIG. 19, the file size of the separate file after the data is inserted exceeds the maximum file size defined by the file system (4 GB for FAT32) and, therefore, it is necessary to separate the file into three or more separate files.

On the basis of the determination, the file conversion processing sub-unit 153 separates the edited file (the concatenated file) received from the application execution sub-unit 152 and indicated by (e) in FIG. 19. Thereafter, the file conversion processing sub-unit 153 generates the edited files (the separate files) having renamed file name, as indicated by (d) in FIG. 19.

That is, in terms of the separate file [f01] into which the data is inserted, the file conversion processing sub-unit 153 generates an updated file [edited f01] that includes the inserted data. In addition, the file conversion processing sub-unit 153 further separates the file [edited f01] so that each of the separate files has a file size smaller than or equal to the maximum file size defined by the file system (4 GB for FAT32). As indicated by (d) in FIG. 19, separate files [f01 (new)], [f02 (new-rn)], and [f03 (new-rn)] are generated through the additional separation process. Note that when the separation process is performed, the rule applied to the first data recording process is also applied to the separation process. That is, one of the rules illustrated in FIG. 8 is applied to the separation process.

Furthermore, when the additional separation process is performed, the file names of the separate files are changed. That is, since the number of edited separate files is larger than the number of separate files to be edited, the serial number rule for the names of separate files is not satisfied unless new file names are set. According to the serial number rule for the names of separate files, separate files generated by separating an original file have file extensions or filenames that are serial numbers. That is, the serial number rule for the names of separate files is the rule described above with reference to FIG. 9.

If it is difficult to satisfy the serial number rule for the names of separate files, the file conversion processing sub-unit 153 changes the file names of the separate files. That is, the file names of the separate files are changed (renamed) so that the serial number rule for the names of separate files is satisfied. That is, as indicated by (d) in FIG. 19, the names of the edited separate files are renamed so that the serial number rule for the names of separate files is satisfied. The file with "(rn)" indicated by (d) of FIG. 19 are renamed separate file. All of the separate files subsequent to the new separate file [f02 (new-rn)] are renamed.

In this way, the separate files [f00], [f01 (new)], [f02 (new-rn)], [f03 (new-rn)], [f04 (rn)], and [f05 (rn)], some of which have been updated, are supplied from the file conversion processing sub-unit 153 to the second-media support file system sub-unit 154 and are recorded onto the second medium 112.

As described above, by changing the file names so that the serial number rule for the names of separate files is satisfied and recording the files onto the second medium 112, the separate files can be reliably read from the second medium 112 in a readout process.

Figure 20:
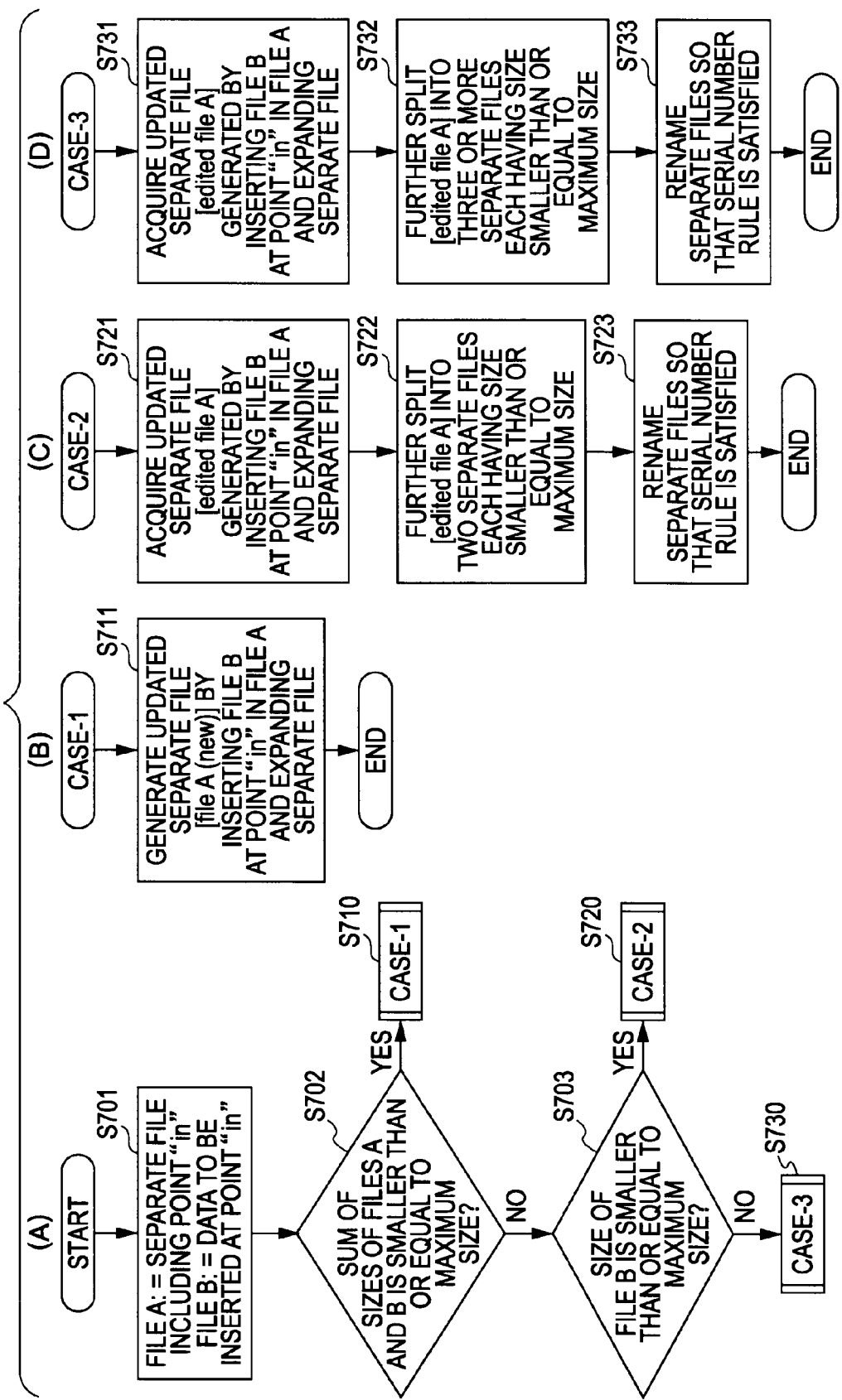
FIG. 20 is a flowchart illustrating the sequence of processes of an exemplary file conversion process performed when data is inserted in a data editing process.

As described above with reference to the flowcharts illustrated in FIGS. 17 to 19, the processing is performed by the file conversion processing sub-unit 153 when data editing including data insertion is performed by the application execution sub-unit 152 (Cases 1 to 3). FIG. 20 is a flowchart of the processing sequence performed by the file conversion processing sub-unit 153 when data editing including data insertion in Cases 1 to 3 is performed.

The flowchart in FIG. 20 illustrates the following sequence of processes:

(A) whole sequence,
(B) sequence of processes in Case 1 (refer to FIG. 17),
(C) sequence of processes in Case 2 (refer to FIG. 18), and
(D) sequence of processes in Case 3 (refer to FIG. 19). The whole sequence (A) is described first. The whole sequence (A) represents the sequence performed by the file conversion processing sub-unit 153 when the file conversion processing sub-unit 153 detects submission of an instruction to write data onto the second medium 112 after data editing including data insertion performed by the application execution sub-unit 152 is completed.

Upon detecting submission of an instruction to write data onto the second medium 112, the file conversion processing sub-unit 153 receives the edited data from the application execution sub-unit 152. Thereafter, in step S701, the file conversion processing sub-unit 153 analyzes the edited data. At that time, the file conversion processing sub-unit 153 uses the data stored in the memory when the file conversion processing sub-unit 153 supplied the data to be edited to the application execution sub-unit 152, as described above with reference to FIGS. 17 to 19, that is, the file name of each of the separate files that form the concatenated file and the start and end positions of the data of each of the separate files.

In step S701, the file conversion processing sub-unit 153 defines the separate file including the start position "in" at which data is inserted and a file formed by the insertion data as follows:

file A=the separate file including the start position "in" at which data is inserted, and file B=a file formed by the insertion data.

In step S702, the file conversion processing sub-unit 153 determines whether the sum of the sizes of the files A and B obtained in step S701 satisfies the specification defined by the file system employed by the second medium 112. That is, it is determined whether the sum is less than or equal to 4 GB when the second medium 112 is a FAT32 compatible medium. If the sum of the file sizes satisfies the specification defined by the file system employed by the second medium 112, the processing proceeds to step S710, where the processing for Case 1 (B) is performed. This processing corresponds to the processing illustrated in FIG. 17.

However, if, in step S702, the sum of the file sizes does not satisfy the specification defined by the file system employed by the second medium 112, the processing proceeds to step S703, where it is further determined whether the file size of the file B (the insertion data) satisfies the specification defined by the file system employed by the second medium 112. If the file size of the file B satisfies the specification defined by the file system employed by the second medium 112, the processing proceeds to step S720, where the processing for Case 2 (C) is performed. This processing corresponds to the processing illustrated in FIG. 18.

However, if, in step S703, the file size of the file B (the insertion data) does not satisfy the specification defined by the file system employed by the second medium 112, the processing proceeds to step S730, where the processing for Case 3 (D) is performed. This processing corresponds to the processing illustrated in FIG. 19.

The sequence of processes performed in Case 1 (B) shown in FIG. 20 is described next. In Case 1, a file A=the separate file including the start point "in" at which data is inserted, a file B=a file formed by the insertion data, and the sum of the file sizes of the files A and B satisfies the specification defined by the file system employed by the second medium 112. That is, the process in the case illustrated in FIG. 17 is performed.

In such a case, in step S711, the file conversion processing sub-unit 153 generates an updated separate file [file A (new)] including the file B (the insertion data) inserted at the point "in" in the file A. The file conversion processing sub-unit 153 does not update the separate files other than the update separate files [file A (new)]. This processing corresponds to the processing for generating an edited file (a separate file) indicated by (d) in FIG. 17.

The separate files generated through the processing performed in step S711 are supplied to the second-media support file system sub-unit 154 and are recorded onto the second medium 112.

The sequence of processes (C) of Case 2 illustrated in FIG. 20 is described next. In Case 2, a file A=the separate file including the start point "in" at which data is inserted, a file B=a file formed by the insertion data, and the sum of the file sizes of the files A and B exceeds the upper limit defined by the file system employed by the second medium 112 and, therefore, it is necessary to generate two separate files. That is, the process in the case illustrated in FIG. 18 is performed.

In such a case, in step S721, the file conversion processing sub-unit 153 acquires an updated separate file [edited file A] generated by inserting the file B at the insertion data point (the point "in") of the file A and expanding the file A. Thereafter, in step S722, the file conversion processing sub-unit 153 further separates the separate file [edited file A] including the insertion data into two separate files each having a size smaller than or equal to the allowable maximum file size.

As indicated by (d) shown in FIG. 18, through the separation process performed in step S722, the separate files [f01 (new)] and [f02 (new-rn)] are generated. Note that when the separation process is performed, the rule applied to the first data recording process is also applied to the separation process. That is, one of the rules illustrated in FIG. 8 is applied to the separation process.

Subsequently, in step S723, the names of the separate files are changed (renamed) so that the serial number rule for the names of separate files is satisfied. That is, the names of the separate files are renamed so that the serial number rule for the names of separate files illustrated in FIG. 9 is satisfied. The processing performed in steps S721 to 5723 corresponds to the process for generating the edited file (the separate file) indicated by (d) in FIG. 18.

The separate files generated through the processing performed in steps S721 to S723 are supplied to the second-media support file system sub-unit 154 and are recorded onto the second medium 112.

The sequence of processes (D) of Case 3 illustrated in FIG. 20 is described next. In Case 3, a file A=the separate file including the start point "in" at which data is inserted, a file B=a file formed by the insertion data, and the sum of the file sizes of the files A and B exceeds the upper limit defined by the file system employed by the second medium 112 and, therefore, it is necessary to generate three or more separate files. That is, the process in the case illustrated in FIG. 19 is performed.

In such a case, in step S731, the file conversion processing sub-unit 153 acquires an updated separate file [edited file A] generated by inserting the file B at the insertion data point (the point "in") of the file A and expanding the file A. Thereafter, in step S732, the file conversion processing sub-unit 153 further splits the separate file [edited file A] including the insertion data into two separate files each having a size smaller than or equal to the allowable maximum file size.

As indicated by (d) shown in FIG. 19, through the separation process performed in step S732, the separate files [f01 (new)], [f02 (new-rn)], and [f03 (new-rn)] are generated. Note that when the separation process is performed, the rule applied to the first data recording process is also applied to the separation process. That is, one of the rules illustrated in FIG. 8 is applied to the separation process.

Subsequently, in step S733, the names of the separate files are changed (renamed) so that the serial number rule for the names of separate files is satisfied. That is, the names of the separate files are renamed so that the serial number rule for the names of separate files illustrated in FIG. 9 is satisfied. The processing performed in steps S731 to S733 corresponds to the process for generating the edited file (the separate file) indicated by (d) in FIG. 19.

The separate files generated through the processing performed in steps S731 to S733 are supplied to the second-media support file system sub-unit 154 and are recorded onto the second medium 112.

7. Other Exemplary Configurations of Information Processing Apparatus

While the foregoing embodiments have been described with reference to the process performed by an apparatus having a configuration including a plurality of media serving as data recording media (e.g., the information processing apparatus shown in FIG. 1), the process described in the foregoing embodiment can be applied to an apparatus having a configuration not including the first medium 111 as shown in FIG. 1. That is, the process can be applied to an apparatus having a configuration including only the second medium 112. More specifically, as shown in FIG. 21, the process can be applied to an apparatus having a configuration including only a recording medium 512 and not including the first medium 111 as illustrated in FIG. 1.

Figure 21:
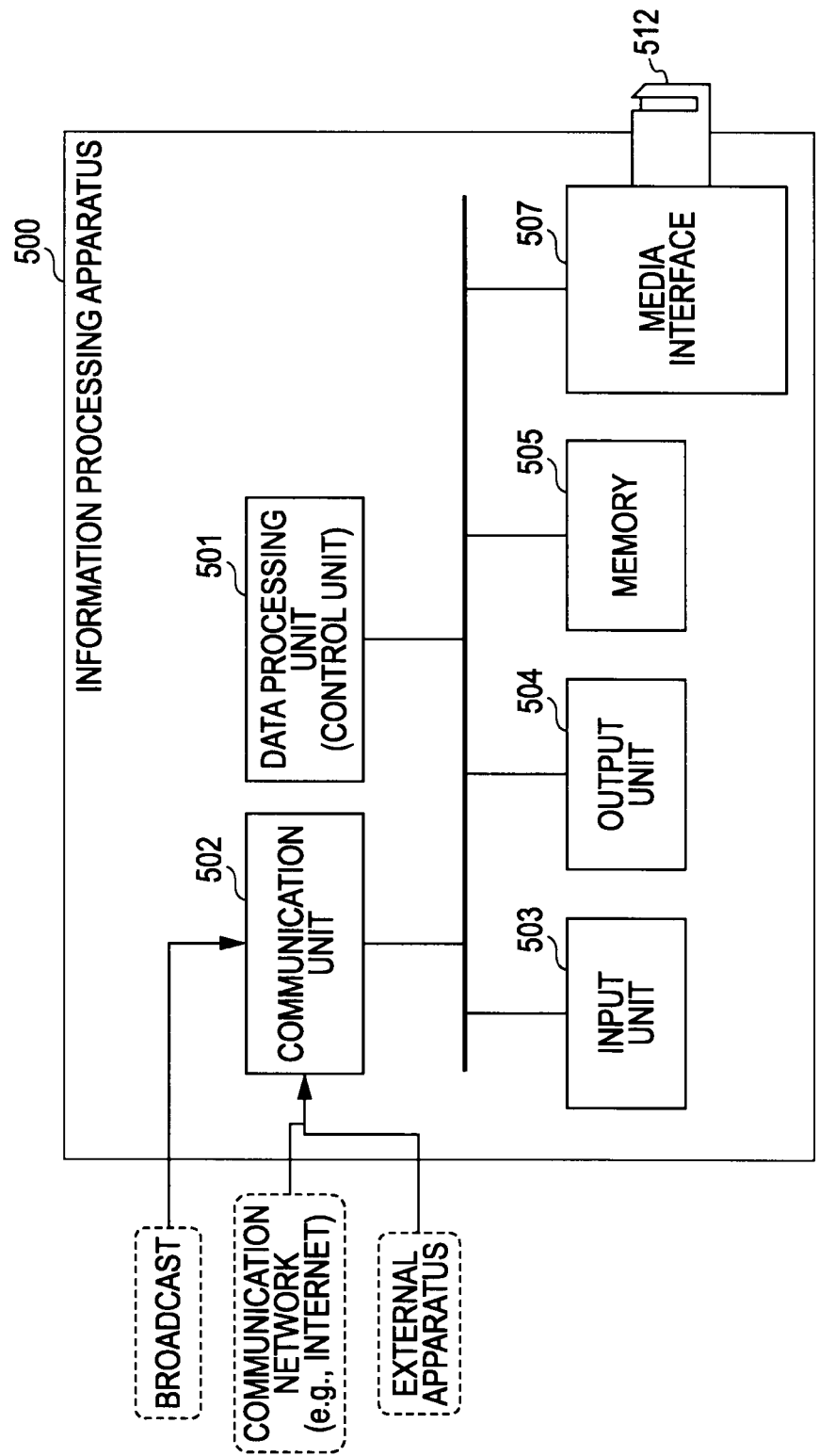
FIG. 21 is an exemplary configuration of an information processing apparatus according to an embodiment of the present invention.

As shown in FIG. 21, an information processing apparatus 500 includes a data processing unit (a control unit) 501, a communication unit 502, an input unit 503, an output unit 504, a memory 505, a media interface 507, and the recording medium 512. The data processing unit (a control unit) 501, the communication unit 502, the input unit 503, the output unit 504, and the memory 505 have configurations similar to those of the data processing unit (the control unit) 101, the communication unit 102, the input unit 103, the output unit 104 and the memory 105 shown in FIG. 1, respectively.

The media interface 507 and the recording medium 512 correspond to the second media interface 107 and the second medium 112 in the configuration shown in FIG. 1, respectively. In the configuration shown in FIG. 21, the recording medium 512 records data in accordance with the specification of a file system, such as FAT32. However, as described in the above embodiment, the data processing unit 501 performs data processing in accordance with the specification of a file system (e.g., UDF) that is different from the file size rule and the file name rule defined by the file system employed by the recording medium 512.

In the configuration shown in FIG. 21, data is recorded onto only the recording medium 512. However, by using a configuration in which the file conversion processing sub-unit 153 as illustrated in FIG. 2 is set in the recording medium 512 and file conversion is performed, data can be recorded, reproduced, and edited using the recording medium 512. In this way, the embodiment of the present invention can be applied to a variety of configurations in which a data file used by an application executed by an application execution sub-unit of the information processing apparatus does not comply with the rule defined by the file system employed by a medium on which data is recorded or from which data is reproduced.

Although the invention has been described in conjunction with specific embodiments thereof, it is evident that many alternatives, modifications and variations will be apparent to those skilled in the art within the spirit and broad scope of the invention. That is, the present invention has been described with reference to various examples, and it should not be construed that the technical scope of the invention is limited thereto. It should be understood that the scope of the invention is to be determined only from the appended claims.

The above-described series of processes can be executed by hardware, software, or a combination thereof. When the above-described series of processes are executed by software, the programs that defines the sequence of processes can be installed in a memory of a computer incorporated in dedicated hardware and be executed. Alternatively, the programs can be installed in a general-purpose computer that can execute a variety of processes and be executed. For example, the programs can be prerecorded in a recording medium. In addition to being installed from the recording medium, the programs can be received via a network, such as a local area network (LAN) or the Internet and be installed in a recording medium, such as a hard disk, incorporated in a computer.

It should be noted that the steps described in the present specification may be executed in not only in the above-described sequence, but also in parallel or independently in accordance with the processing power of the apparatus that executes the steps or the necessity of the processing. In addition, as used herein, the term "system" refers to a logical combination of a plurality of devices; the plurality of devices is not necessarily included in one body.

The present application contains subject matter related to that disclosed in Japanese Priority Patent Application JP 2009-032056 filed in the Japan Patent Office on Feb. 13, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
circuitry configured to implement:
an application execution unit configured to generate data to be recorded onto a first medium and a second medium in the information processing apparatus that records the data, read the data from the first medium and the second medium, and reproduce the data using a first file system for the first medium and a second file system for the second medium;
a file system unit configured to manage the data recorded on the second medium using the second file system; and
a file conversion unit configured to perform conversion between a first file format defined by the first file system that is processable by the application execution unit and a second file format defined by the second file system that is also processable by the application execution unit,
wherein the file conversion unit separates a file of the data to be recorded onto the second medium into a plurality of files, the data being generated by the application execution unit by reading from the first medium, each of the plurality of files having a file size which is smaller than or equal to a maximum file size allowable by the second file system, when the file conversion unit determines that a file size of the file of the data exceeds the maximum file size, and supplies the generated separate files to the file system unit in the form of files to be recorded,
wherein the file conversion unit assigns a file name to each of the separate files recorded onto the second medium, and each of the file names includes identification information regarding an original file name of the file of the data by reading from the first medium and information regarding arrangement of the separate files, and
wherein the file conversion unit receives a file read from the second medium, the file being subjected to editing processing performed by the application execution unit, and performs a file conversion process on the received file, and when the editing processing will result in data insertion, the file conversion unit identifies a file to be edited having the second file format and including data to be inserted by the data insertion, performs a file conversion process including at least one of updating of the file to be edited and generating of a new file having the second file format in accordance with a data state after the data insertion, and supplies the edited file to the file system unit as a file to be recorded.

2. The information processing apparatus according to claim 1, wherein the file conversion unit receives a data read request from the application execution unit and acquires the file names of the separate files recorded on the second medium using the original file name contained in the data read request, and wherein the file conversion unit outputs, to the file system unit, a read request having parameters representing the acquired file names of the separate files.

3. The information processing apparatus according to claim 2, wherein the file conversion unit concatenates the separate files read from the second medium by the file system unit, generates a readout file requested by the application execution unit, and supplies the generated readout file to the application execution unit.

4. The information processing apparatus according to claim 1, wherein the file conversion unit receives a file read from the second medium and subjected to editing processing performed by the application execution unit and performs a file conversion process on the received file, and when the editing processing will result in data deletion, the file conversion unit identifies a file to be edited having the second file format and including data to be deleted by the data deletion, performs a file conversion process including at least one of updating of the file to be edited and deleting of the file to be edited in accordance with a data state after the data deletion, and supplies the edited file to the file system unit as a file to be recorded.

5. An information processing method for use in an information processing apparatus including circuitry configured to implement an application execution unit, a file conversion unit, and a media interface, the method comprising the steps of:
generating data to be recorded onto a first medium and a second medium in the information processing apparatus that records the data, reading the data from the first medium and the second medium, and reproducing the data using the application execution unit of the information processing apparatus using a first file system for the first medium and a second file system for the second medium;
performing conversion between a first file format defined by the first file system that is processable by the application execution unit and a second file format defined by the second file system that is also processable by the application execution unit employed by the second medium using the file conversion unit of the information processing apparatus; and
recording, onto the second medium, a file generated in the step of performing conversion using the media interface of the information processing apparatus,
wherein, the step of performing conversion further includes separating a file of the data to be recorded onto the second medium into a plurality of files, the data being generated by reading from the first medium, each of the plurality of files having a file size which is smaller than or equal to a maximum file size allowable by the second file system, when a file size of the file of the data exceeds the maximum file size, and supplying the generated separate files in the form of files to be recorded,
wherein, the step of performing conversion further includes assigning a file name to each of the separate files recorded onto the second medium, and each of the file names includes identification information regarding an original file name of the file generated by the application execution unit by reading from the first medium and information regarding arrangement of the separate files, and
wherein, the step of performing conversion further includes:
receiving a file read from the second medium, the file being subjected to editing processing;
performing a file conversion process on the received file; and
when the editing processing will result in data insertion:
identifying a file to be edited having the second file format;
including data to be inserted by the data insertion;
performing a file conversion process including at least one of updating of the file to be edited and generating of a new file having the second file format in accordance with a data state after the data insertion; and
supplying the edited file as a file to be recorded.

6. A non-transitory computer readable storage medium including executable instructions, which when executed by a computer cause a computer to execute a method for use in an information processing apparatus including circuitry configured to implement an application execution unit, a file conversion unit, and a media interface, the method comprising the steps of:
generating data to be recorded onto a first medium and a second medium in the information processing apparatus that records the data,reading the data from the first medium and the second medium, and reproducing the data using the application execution unit of the information processing apparatus using a first file system for the first medium and a second file system for the second medium;
performing conversion between a first file format defined by the first file system that is processable by the application execution unit and a second file format defined by the second file system that is also processable by the application execution unit employed by the second medium using the file conversion unit of the information processing apparatus; and
recording, onto the second medium, a file generated in the step of performing conversion using the media interface of the information processing apparatus,
wherein, the step of performing conversion further includes separating a file of the data to be recorded onto the second medium into a plurality of files, the data being generated by reading from the first medium, each of the plurality of files having a file size which is smaller than or equal to a maximum file size allowable by the second file system, when a file size of the file of the data exceeds the maximum file size, and supplying the generated separate files in the form of files to be recorded,
wherein, the step of performing conversion further includes assigning a file name to each of the separate files recorded onto the second medium, and each of the file names includes identification information regarding an original file name of the file generated by the application execution unit by reading from the first medium and information regarding arrangement of the separate files, and
wherein, the step of performing conversion further includes:
receiving a file read from the second medium, the file being subjected to editing processing;
performing a file conversion process on the received file; and
when the editing processing will result in data insertion:
identifying a file to be edited having the second file format;
including data to be inserted by the data insertion;

performing a file conversion process including at least one of updating of the file to be edited and generating of a new file having the second file format in accordance with a data state after the data insertion; and supplying the edited file as a file to be recorded.

* * * * *